March 25, 1958    J. SUOZZO ET AL    2,827,980
ELEVATOR SYSTEMS
Filed Sept. 9, 1955    11 Sheets-Sheet 1

March 25, 1958 J. SUOZZO ET AL 2,827,980
ELEVATOR SYSTEMS
Filed Sept. 9, 1955 11 Sheets-Sheet 11

United States Patent Office 2,827,980
Patented Mar. 25, 1958

2,827,980

ELEVATOR SYSTEMS

John Suozzo, Paramus, and Danilo Santini, Tenafly, N. J., assignors to Westinghouse Electric Corporation, East Pittsburgh, Pa., a corporation of Pennsylvania Application September 9, 1955, Serial No. 533,431

23 Claims. (Cl. 187—29)

This invention relates to elevator systems and it has particular relation to elevator systems designed for operation in any of a plurality of modes of operation.

Although aspects of the invention are suitable for elevator systems wherein the elevator cars are operated by attendants, the invention is particularly suitable for elevator systems designed for operation without attendants. For this reason, the description will be directed primarily to an operatorless system.

Various modes of operation of an elevator system now are well known in the art. For example, an elevator system may be designed to provide a first mode of operation for intermittent or off-hours service. Such service is desirable for a period in which the demand for elevator service is light and intermittent. Thus, the off-hours mode of operation is suitable for an office building during the night.

A second mode of operation is known as an up-peak mode. Such a mode is desirable during periods of day in which the demand for elevator service primarily is in the up direction. Thus, up-peak operation for an office building may be desirable at the start of a business day and at the close of the luncheon period.

A third mode of operation is known as down-peak operation. It is desirable during periods of the day in which the demand for elevator service predominantly is in the down direction. Down-peak operation is desirable at the beginning of the luncheon hour in an office building and at the close of the business day.

A fourth mode of operation is known as off-peak operation. Such operation of an elevator system may be encountered during business hours in an office building. During such business hours the demand for elevator service is substantially balanced in the two directions of travel of the elevator cars.

In the copending patent application, Serial No. 444,461, filed July 20, 1954, by John Suozzo and assigned to the assignee of the present patent application, now Patent No. 2,795,296, it is proposed to control the transfer of an elevator system from one mode of operation to a second mode of operation in accordance with a function of the stops of the elevator cars at floors or landings served thereby. In accordance with the present invention, the transfer is dependent on a function of the calls for elevator service. In a preferred embodiment of the invention, an elevator system is transferred to an up-peak mode of operation when the ratio of registered calls requiring up travel of the elevator cars to the total registered calls for elevator service exceeds a predetermined value.

The invention further contemplates the transfer of an elevator system to a predetermined mode of operation in response to a function of the bypassing operation of the elevator cars. The transfer also may be made dependent on other conditions. In a preferred embodiment of the invention an elevator system is transferred to a down-peak mode of operation when all of the following conditions are present:

(1) At least a predetermined number of down floor calls are registered by intending passengers from a low zone of floors or landings served by the elevator cars.

(2) At least a predetermined number of down floor calls are registered by intending passengers from a high zone of landings or floors served by the elevator cars.

(3) Elevator cars at the lower terminal floor are not substantially loaded prior to departure from the terminal floor.

(4) Elevator cars set for travel in the down direction are bypassing at at least a predetermined rate. The required rate may be reduced after a predetermined rate is once reached.

When once transferred to the down-peak mode of operation, the elevator system may remain in such mode for at time which is reset for each bypassing operation of an elevator car.

Under certain circumstances, the elevator cars may park with their doors closed. Under such circumstances, an aspect of the invention contemplates that certain auxiliary equipment will be shut down. Such auxiliary equipment may include car lamps for illuminating the elevator cars and fans for the elevator cars.

For purposes of economy, certain additional equipment may be shut down when not required. For example, during off-hours operation the motor generator sets may be shut down for substantial periods of time. As the system leaves off-hours operation, the motor generator set of each of the cars may be started and may be left in operation until the system returns to off-hours operation.

It is, therefore, an object of the invention to provide an elevator system having an improved control for transferring the elevator system from one to another mode of operation.

It is a further object of the invention to provide an elevator system wherein the transfer of the elevator system from one to another mode of operation is dependent on the relationship between calls for elevator service in one direction and total calls for elevator service.

It is an additional object of the invention to provide an elevator system wherein the transfer of the system from one to another mode of operation is dependent on a bypassing operation of the system.

It is also an object of the invention to provide an elevator system wherein the transfer of the system from one to another mode of operation is dependent on a bypassing operation of the system, the registration of calls for elevator service in the first direction, and the loading of the elevator cars set for travel in a second direction.

It is another object of the invention to provide improved controls for controlling the shutdown of elevator equipment during periods of non use.

Other objects of the invention will be apparent from the following description taken in conjunction with the accompanying drawings, in which.

Figure 7:
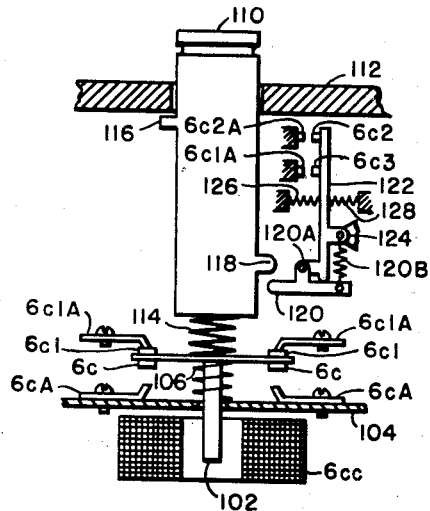

Figs. 2, 3, 4, 5, and 6 are schematic views including circuits in straight-line form of a control system embodying the invention;

Figs. 2A, 3A, 4A, and 5A are key representations of electromagnetic relays and switches employed in the circuits of Figs. 2, 3, 4, and 5. If Figs. 2, 3, 4, and 5 are horizontally aligned respectively with Figs. 2A, 3A, 4A, and 5A, it will be found that coils and contacts of the switches and relays appearing in the key representations are horizontally aligned with the corresponding coils and contacts shown in these circuits;

Fig. 7 is a view in sectional elevation of a car call button; and

Figure 8:
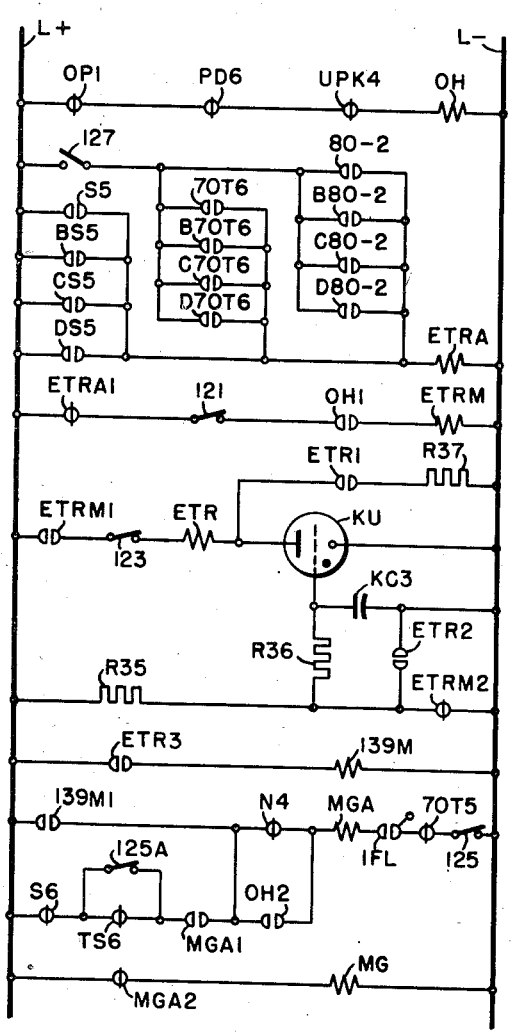

Fig. 8 is a schematic view of circuits in straight-line form of a modified control system embodying the invention.

Although the invention may be incorporated in an elevator system employing various numbers of elevator cars serving buildings or structures having various numbers of floors, the invention can be described adequately with reference to an elevator system having four elevator cars serving a building having seven floors. The elevator cars may be dispatched from any desired floors. The elevator cars will be assumed to be dispatched from the first floor and the upper terminal or seventh floor.

Because of the complexity of such systems, certain conventions have been adopted. The elevator cars are identified by the reference characters A, B, C and D. Since the circuits for the cars are similar, substantially complete circuits are shown for the cars A and B. Components associated with the cars C and D are discussed only as required.

Components associated with the elevator cars B, C and D which correspond to a component of the elevator car A are identified by the same reference character employed for the component of the elevator car A preceded by the letters B, C and D, respectively. For example, the reference characters U, BU, CU and DU designate up switches, respectively, for the elevator cars A, B, C and D. The discussion will be directed primarily to the apparatus and circuits for the elevator car A.

The various relays and switches employed in the circuits may have break or back contacts which are closed when the relay is deenergized and dropped out. The break contacts are open when the relays or switches are energized and picked up.

The relays and switches also may have front or make contacts which are opened when the switches and relays are deenergized and dropped out. These contacts are closed when the switches and relays are energized and picked up. In the drawings the various switches and relays are shown insofar as possible in their deenergized and dropped-out conditions.

Each set of the contacts associated with a relay or switch is identified by the reference character associated with the relay or switch followed by a numeral identifying the specific set of contacts. Thus, the reference characters U1, U2 and U3 designate, respectively, the first, second and third sets of contacts of the up switch U.

In order to facilitate the presentation of the invention, the apparatus shown in the figures will be briefly set forth, and the operation of the complete system thereafter will be discussed. The system includes in part the following apparatus:

APPARATUS SPECIFIC TO CAR A

V—speed relay
U—up switch
M—car-running relay
D—down switch
G—holding relay
E—slowdown inductor relay
F—stopping inductor relay
W—up-preference relay
X—down-preference relay
70T—timing relay
TT—car-call stopping relay
K—floor-call stopping relay
80—main starting relay
L—car-position relay
N—loading relay
S—auxiliary starting relay
40—door relay
45—door-control relay
DC—door-close solenoid
DO—door-open solenoid
P—load relay
78—call relay
MG—motor relay
LF—auxiliary control relay
LWL—light load relay

APPARATUS COMMON TO ALL CARS

2DR to 7DR—down floor-call storing relays
1UR to 6UR—up floor-call storing relays
2URA to 6URA—up auxiliary relays
2DRA to 7DRA—down auxiliary relays
QP—auxiliary load relay
PT—load-time relay
MGT—auxiliary motor relay
QH—first quota relay
QL—second quota relay
PD—down peak relay
PDT—down peak time relay
ETRA—motor initiating relay
ETRM—motor intermediate relay
ETR—motor timing relay
139M—motor master relay
MGA—auxiliary motor relay
OH—off-hours relay

Figure 1:
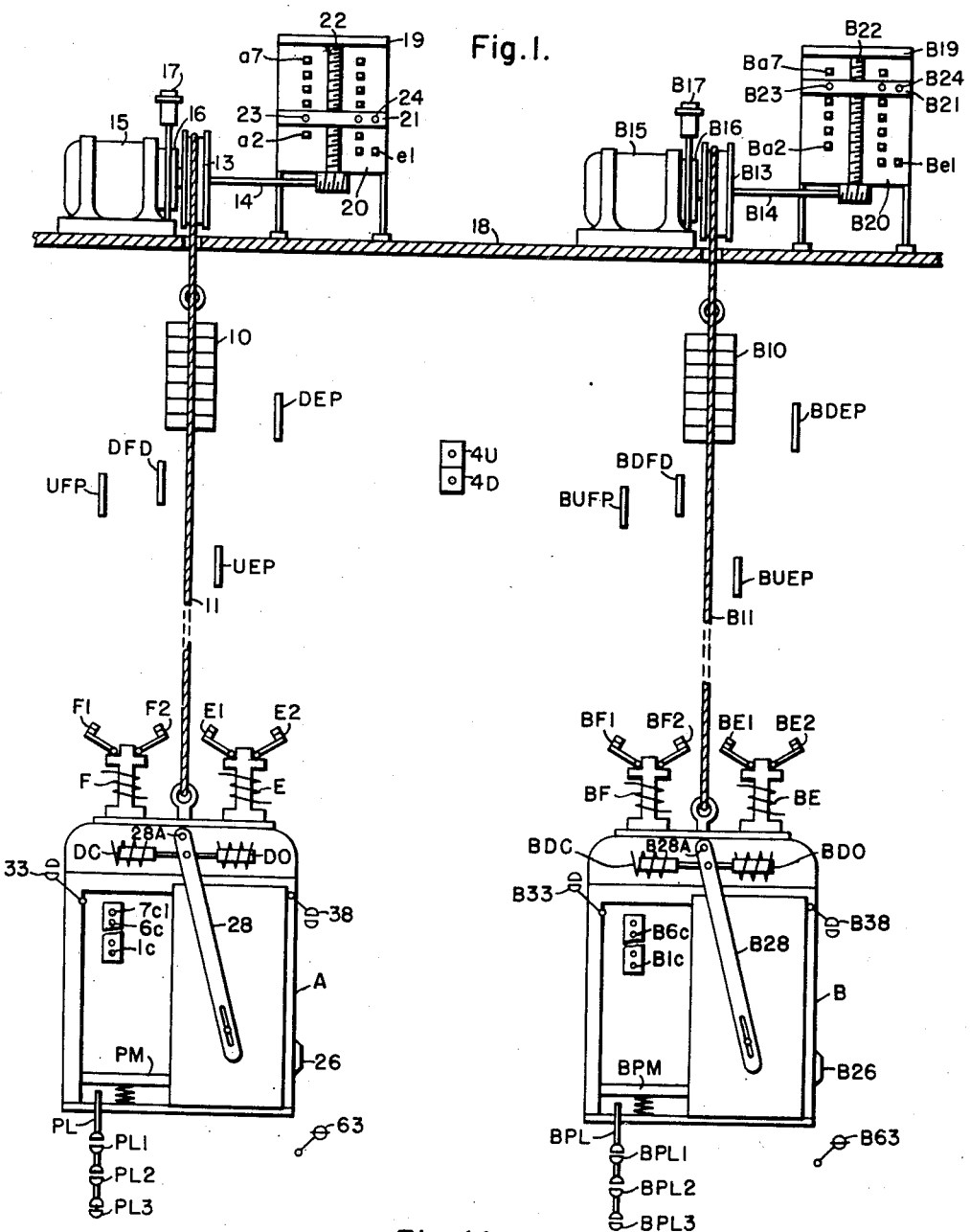
Figure 1 is a schematic view with parts in elevation and parts broken away of an elevator system which may embody the invention.

*Figure 1*

Fig. 1 illustrates the structural relationships of the elevator cars A, B and associated apparatus with reference to the building structure which the elevator cars are intended to serve.

The elevator car A and a counterweight 10 are secured to opposite ends of a rope or cable 11 which passes over a sheave 13. The sheave 13 is mounted on the shaft 14 of an elevator driving motor 15. The shaft 14 also carries a brake drum 16 with which a brake 17 of the conventional spring-applied electrically-released type is associated. The motor 15 is secured to the floor 18 of a penthouse located in the structure which the elevator car is intended to serve.

In order to simplify the association of control circuits with the elevator car A, a control device 19 is provided which is operated in accordance with a function of the movement of the elevator car A. In the specific embodiment of Fig. 1, the control device takes the form of a floor selector which includes an insulating panel 20 and a brush carriage 21. A screw 22 is mounted for rotation relative to the panel 20. This screw conveniently may be coupled through suitable gearing to the shaft 14 for rotation in accordance with movement of the elevator car A.

The brush carriage 21 is in threaded engagement with the screw 22. As the elevator car A moves upwardly, the brush carriage 21 is moved upwardly but at a rate much slower than the rate of movement of the elevator car. Similarly, when the elevator car A moves downwardly, the brush carriage 21 also moves downwardly at a slower rate.

The panel 20 carries a plurality of contact segments which are insulated from each other. Thus, the contact segments $a2$ to $a7$ are arranged in a row on the panel 20. As the elevator car proceeds upwardly from the first floor, a brush 23 mounted on the carriage 21 successively engages the contact segments $a2$ to $a7$, as the elevator car approaches respectively the floors 2 to 7 of the structure. It will be understood that the contact segments $a2$ to $a7$ are spaced from each other in accordance with the spacings of the floors. As will be pointed out below, these contact segments are employed with circuits controlling the stopping of the elevator car during up travel in response to car calls.

As a further example, the panel 20 has a single contact segment $e1$ which is engaged by a brush 24 mounted on the carriage 21 only when the elevator car A is adjacent the first or dispatching floor. As will be pointed out below, this contact segment is employed in controlling the operation of a dispatching device.

It will be understood that a number of rows of contact segments and a number of brushes may be employed in the floor selector. However, the foregoing discussion is believed sufficient to illustrate the mechanical relationships of these contact segments and brushes.

Certain apparatus is mounted on or in the elevator car A. Thus, car-call buttons 1c to 7c are provided for registering car calls for the first to seventh floors, respectively.

A slowdown inductor relay E is provided for the purpose of initiating a slowdown of the elevator car A as it approaches a floor at which it is to stop. The inductor relay may be of conventional construction and includes two sets of break contacts E1 and E2. When the coil of the inductor relay E is energized, the contacts remain in the positions illustrated in Fig. 1 until the relay is adjacent an inductor plate located in the hoistway of the elevator car A. For example, when the coil of the inductor relay E is energized and the inductor relay is adjacent the magnetic plate UEP for the second floor, the magnetic circuit is completed, which results in opening of the break contacts E1. When open, the contacts remain open until the coil of the inductor relay E is deenergized. The inductor plate UEP is positioned to be reached by the inductor relay E as the elevator car approaches the second floor for the purpose of initiating slowdown of the elevator car. It will be understood that a similar inductor plate is similarly associated with each of the floors at which the elevator car is required to stop during up travel.

If the coil of the inductor relay E is energized during down travel of the elevator car, and if the relay reaches the inductor plate DEP for the second floor, a magnetic circuit is completed which results in opening of the break contacts E2. When opened, the contacts remain open until the coil is deenergized. The inductor plate DEP is so positioned that it initiates slowdown of the elevator car A a suitable distance from the second floor. A similar inductor plate would be similarly associated with each of the floors at which the elevator car A is to stop during down travel.

The elevator car A also carries a stopping inductor relay F which is similar in construction to the inductor relay E. This relay is employed for initiating a stopping operation of the elevator car A. The stopping inductor relay F cooperates with inductor plates UFP and DFP in a manner which will be clear from the discussion of the cooperation of the slowdown inductor relay with the inductor plates UEP and DEP. If the coil of the relay F is energized and if the elevator car is to stop at the second floor while traveling up, when the inductor relay F reaches the inductor plate UFP a magnetic circuit is completed which results in opening of the break contacts F1. This initiates a stopping operation of the elevator car. An inductor plate similar to the plate UFP is similarly associated with each of the floors at which the elevator car A is to stop during up travel thereof. If the elevator car A during down travel is to stop at the second floor, the coil of the stopping inductor relay F is energized, and when the inductor relay reaches the inductor plate DFP for the second floor, a magnetic circuit is completed which results in opening of the contacts F2. This initiates a stopping operation of the elevator car A. It will be understood that an inductor plate similar to the inductor plate DFP is similarly associated with each of the floors at which the elevator A is to stop during down travel thereof.

The elevator car A also carries a cam 26 which is positioned to operate a mechanical switch 63 located in the hoistway associated with the elevator car. The mechanical switch 63 normally is closed and is opened by the cam 26 when the elevator car A is adjacent the first or dispatching floor. It will be understood that other mechanical switches may be operated in a similar manner by the elevator car A.

An intending passenger on the fourth floor may register a floor call for elevator car service in the up direction by pressing a button of a push-button switch 4U. A similar push-button switch is located at each of the intermediate floors from which an intending passenger may desire to proceed in an up direction.

If the intending passenger at the fourth floor desires to proceed in a down direction, he may press the button of a push-button switch 4D located at the fourth floor. A similar push-button switch is located at each of the intermediate floors from which an intending passenger may desire to proceed in a down direction.

The elevator car A is provided with a door DP which is mounted to slide across the passage through which passengers enter and leave the elevator car. The door is moved by means of a lever 28 which is pivotally mounted on the car by means of a pivot 28A. The lever 28 is moved in a clockwise direction about a pivot by means of a door-close solenoid DC for the purpose of closing the passage and is moved in a counter-clockwise movement about its passage to open the door by means of a door-open solenoid DO.

Figure 1A:
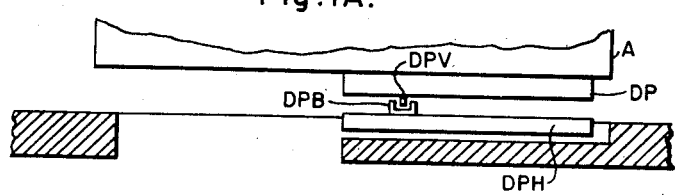
Fig. 1A is a view in section showing an elevator car employed in Fig. 1 associated with a hoistway.

It will be understood that a separate hoistway door DPH (illustrated in Fig. 1A for the elevator car A) is provided for each of the floors served by the elevator car. The coupling of the two doors may be effected in a conventional manner as by a vane DPV which is secured to the door DP for reception in the slot of a slotted block DPB which is mounted on the hoistway door DPH. The hoistway door DPH is moved to close and expose a hoistway passage through which load enters and leaves the elevator car.

If desired, the edge of the door DP which is the leading edge during a door-closing movement may be a safety-edge of conventional type. As well known in the art, when such an edge reaches an obstruction, it operates a switch to stop or reopen the door. In the embodiment of the invention now being discussed, it will be assumed that such an edge is not employed.

A suitable load-responsive device is provided for controlling circuits in accordance with elevator car load. Thus, a spring-mounted platform PM closes normally-open contacts PL1 and PL2 of a switch PL when the elevator car carries a substantial load such as 80% of rated capacity. Also normally-open contact PL3 closes when the elevator car carries a load above a predetermined value such as 30% of capacity.

Figure 2:
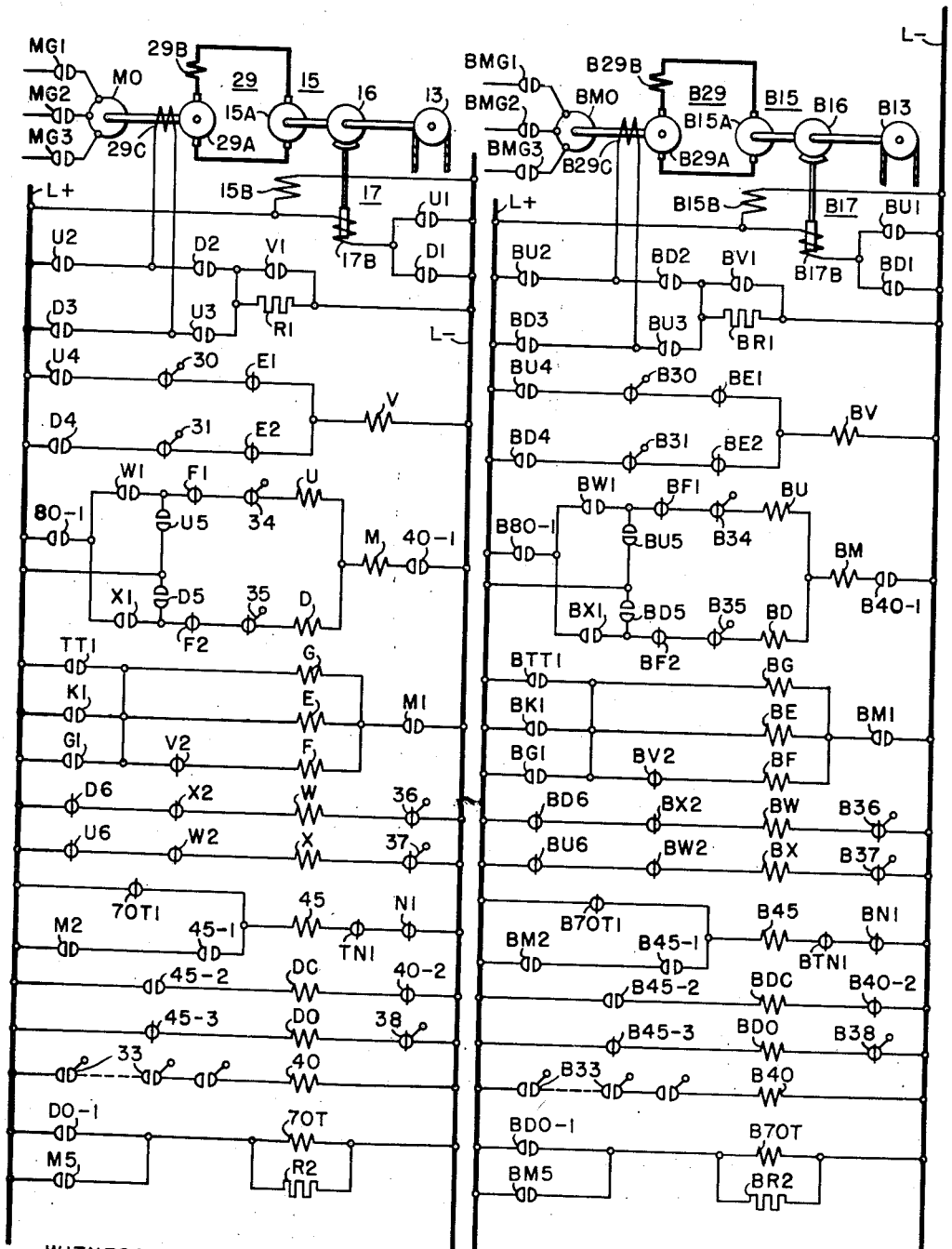
Figure 2A:
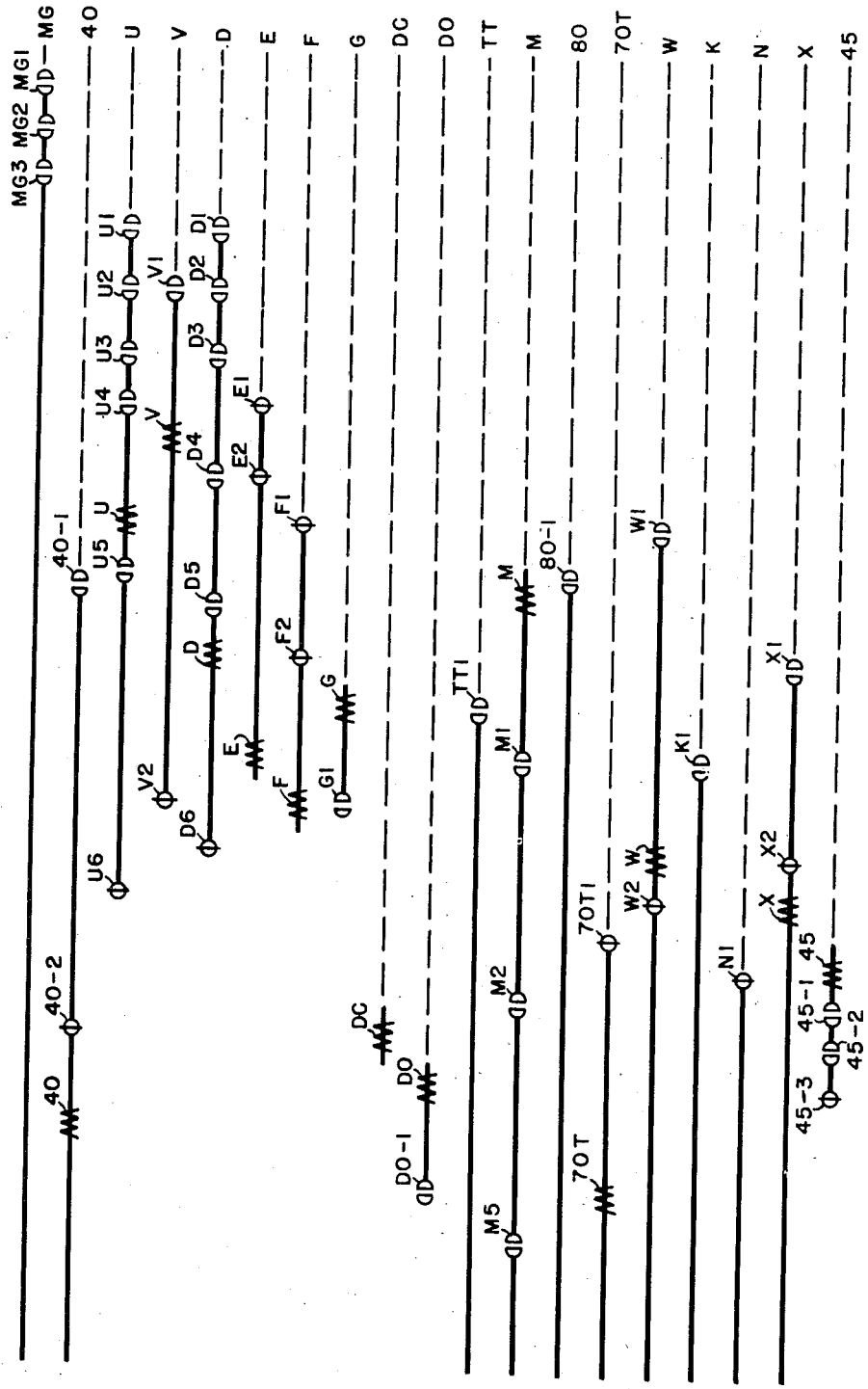

*Figure 2*

Fig. 2 shows circuits for the driving motor, the brake, the speed relay V, the up switch U, the down switch D, the car-running relay M, the holding relay G, the slowdown inductor relay E, the stopping inductor relay F, the up-preference relay W, the down-preference relay X, the timing relay 70T, the door relay 40, the door-control relay 45, the door-close relay DC, and the door-open relay DO. Energy for the various circuits is derived from direct-current buses L+ and L—.

Although various motor control circuits may be employed, it will be assumed that a control circuit of the variable-voltage type is employed. By inspection of Fig. 2, it will be noted that the armature 15A of the driving motor 15 and the armature 29A of a direct-current generator 29, together with a series field winding 29B for the generator, are connected in a series or loop circuit. The field winding 15B for the driving motor 15 is connected directly across the buses L+ and L—.

The magnitude and direction of energization of the driving motor 15 are controlled by the direction and magnitude of the energization of a separately-excited field winding 29C provided for the generator 29. It will be understood that the armature 29A of the generator is rotated at a substantially constant rate by a suitable motor MO which may be a three-phase induction motor connected to a suitable power source through make contacts MG1, MG2, MG3 of a motor relay.

When the elevator car A is conditioned for up travel, the generator field winding 29C is connected across the buses L+, L− through make contacts U2 and U3 of the up switch. When the elevator car A is conditioned for down travel, the generator field winding 29C is connected across the buses through the make contacts D2 and D3 of the down switch. The energizing circuit for the field winding may include a resistor R1 which is shunted by make contacts V1 of the speed relay V. By inspection of Fig. 2, it will be observed that the contacts U2, U3, D2 and D3 constitute in effect a reversing switch for controlling the direction of energization of the field winding. The resistors R1 and the contacts V1 are provided for controlling the magnitude of energization of the field winding.

The speed relay V may be energized through either of two circuits. One of the circuits includes make contacts U4 of the up switch U, a limit switch 30 which is normally closed and which is opened as the elevator car A nears the upper limit of its travel and the break contacts E1 of the slowdown inductor relay E. The other circuit is completed through make contacts D4 of the down switch D, mechanical limit switch 31 which is normally closed and which is opened as the elevator car nears the lower limit of its travel in the down direction, and break contacts E2 of the slowdown inductor relay.

As previously pointed out, the brake 17 normally is spring-biased into engagement with the brake drum 16 and is released by energization of a brake coil 17B. The coil may be energized either through make contacts U1 of the up switch U or through make contacts D1 of the down switch D.

In order to energize the car-running relay M, certain safety devices 33 must be in their safe conditions. Such safety devices may include switches which are open when the doors of the elevator car and the associated hoistway doors are open, and which are closed when the doors are closed to control the door relay 40. Such safety devices are well known in the art. The car-running relay M may be energized through either of two circuits. One of the circuits includes the make contacts 80-1 of the starting relay 80, make contacts W1 of the up-preference relay W, break contacts F1 of the stopping-inductor relay, normally-closed contacts of a mechancial limit switch 34 which are opened when the car nears the upper limit of its travel, and the coil of the up switch U. When energized, the up switch U closes its make contacts U5 to complete a holding circuit around the contacts 80-1 and W1.

The second circuit for energizing the car-running relay M includes the contacts 80-1 of the starting relay, make contacts X1 of the down-preference relay X, break contacts F2 of the inductor stopping relay, normally-closed contacts of a mechanical limit switch 35 which are opened as the elevator car nears the lower limit of its travel in the down direction and the coil of the down switch D. When the down switch D is energized, make contacts D5 are closed to provide a holding circuit around the contacts 80-1 and X1.

Before the holding relay G and the inductor relays E and F can be energized, make contacts M1 of the car-running relay must be closed. In addition, any one set of make contacts TT1 of the car-call stopping relay, and K1 of the floor-call stopping relay must be energized. A holding circuit around these contacts is established upon closure of the make contacts G1. Energization of the inductor stopping relay F further requires closure of the break contacts V2 of the speed relay.

The up-preference relay W is energized only if the elevator car is not operating in the down direction (break contacts D6 are closed); the elevator car is not conditioned for down travel (break contacts X2 are closed); and normally-closed contacts of a mechanical limit switch 36 are closed. The mechanical limit switch 36 is opened as the elevator car reaches its upper limit of travel.

Energization of the down-preference relay X requires closure of the break contacts U6 of the up switch, closure of the break contacts W2 of the up-preference relay, and closure of the normally-closed contacts of a mechanical limit switch 37. The mechanical limit switch 37 is open when the elevator car A is adjacent the first or dispatching floor.

The doors for the elevator car A are controlled by a door-control relay 45. For this relay to be initially energized, the break contacts N1 and TN1 must be closed to indicate that the elevator car is not being loaded at a terminal floor. In addition, the break contacts 70T1 must be closed to indicate that the non-interference time has expired. When the relay 45 picks up, it closes make contacts 45-1 to partially complete a holding circuit for the relay.

The door-control relay 45 controls the energization of the door-close solenoid DC and the door-open solenoid DO. If the contacts 45-2 of the door-control relay are closed, the solenoid DC is energized. The contacts 40-2 are closed when the door of the elevator car A or an associated hoistway door is away from its closed condition.

If the door-control relay 45 is dropped out, the make contacts 45-3 are closed to complete with the switch 38 an energizing circuit for the door-open solenoid DO. The switch 38 is a limit switch which is normally closed and which is opened as the door reaches its fully-open position.

The timing relay 70T is connected for energization by make contacts M5 of the car-running relay or by make contacts DO-1 of the door open relay. It will be noted that a resistor R2 is connected across the timing relay 70T. If the timing relay is energized and the contacts M5 and DO-1 both thereafter open, the relay 70T discharges through the resistor to delay the drop-out of the timing relay 70T for a suitable non-interference time, such as 3 seconds.

Figure 3:
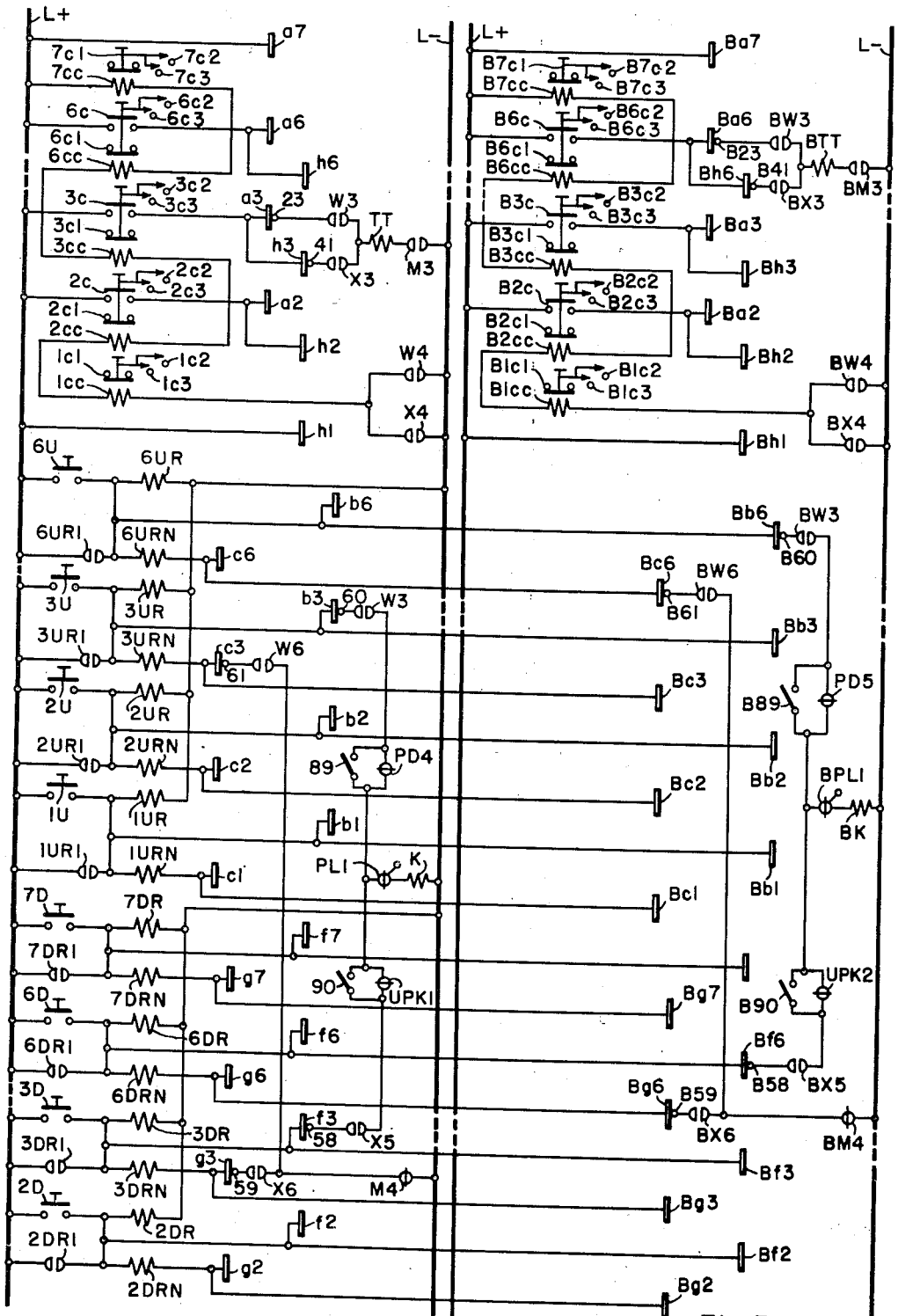
Figure 3A:
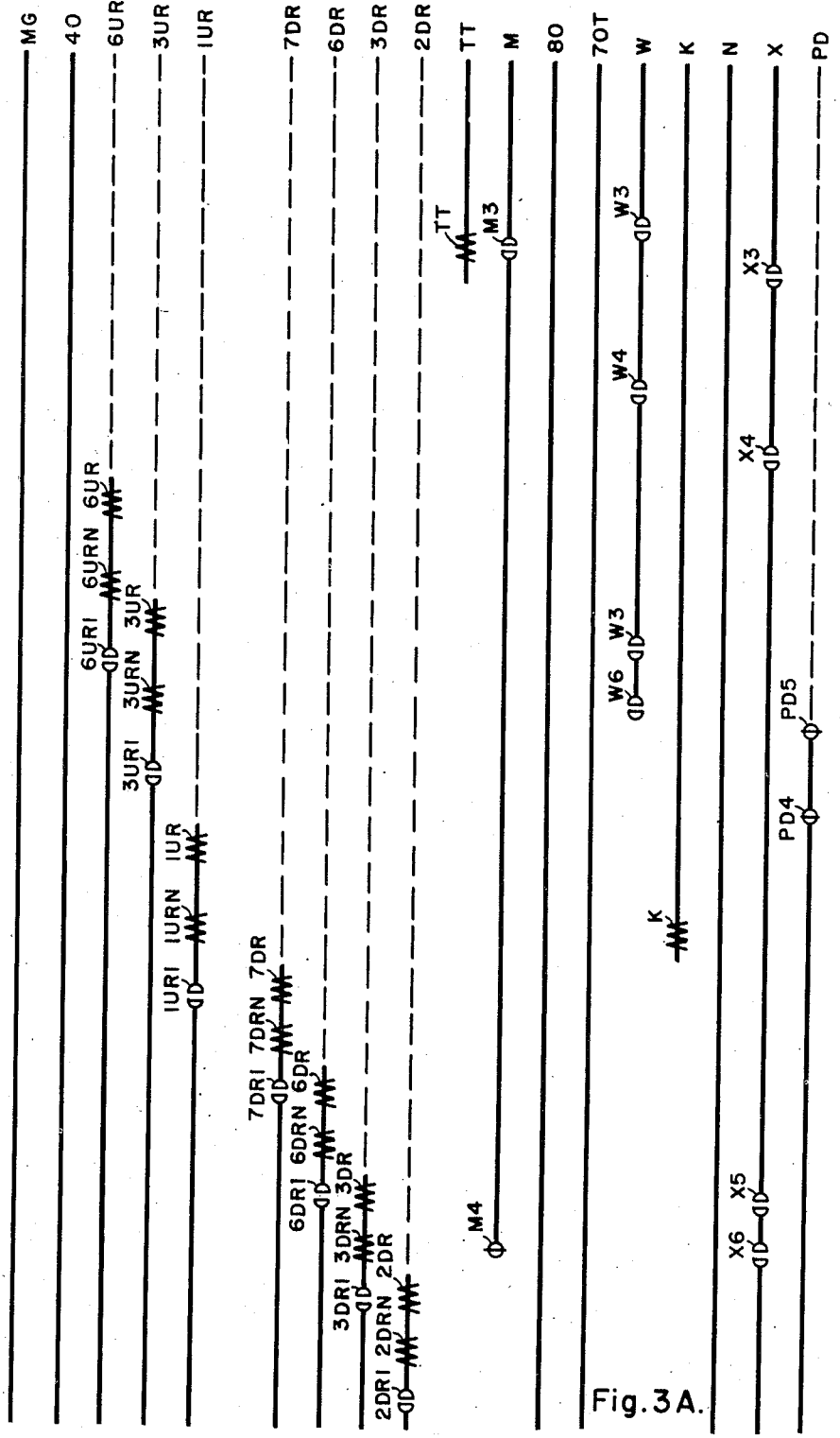

*Figure 3*

Fig. 3 illustrates circuits for energizing the car-call stopping relay TT, and the floor-call stopping relay K.

The car-call push buttons 1c to 6c normally are biased into their open positions. Each of these push buttons and the push button 7c1 is provided with a holding coil 1cc to 7cc, which is effective for holding the associated push button in its operated condition following a manual operation of such push button. To this end, the push buttons may be made of magnetic material. Such construction of the push buttons is well known in the art.

Each of the push buttons 2c to 6c controls the connection of contact segments to the bus L+. Thus, when operated, the push button 2c connects the contact to segments a2 and h2 to the bus L+. The push buttons 3c to 6c similarly connect contact segments for the third to sixth floors to the bus L+. Inasmuch as the elevator car is assumed to stop at the seventh floor or upper terminal floor at all times during up travel, the contact segment a7 is permanently connected to the bus L+. Similarly, during down travel, the elevator car A always stops when it reaches the first floor, and the contact segment h1 for the first floor is permanently connected to the bus L+.

Each of the buttons may have a set of contacts 1c1 to 7c1 which are opened when the associated push button is in operated condition. These are employed to operate a call relay which will be discussed below. Each of the buttons also may have a set of contacts 1c2 to 7c2 and a set 1c3 to 7c3 which are momentarily closed for each operation of a push button.

It will be understood that the contact segments a2 to a7 are arranged in a row on the floor selector 19 of Fig. 1 and are successively engaged by a brush 23 as the elevator car moves from its lower limit to its upper limit of travel. In a similar manner, the contact segments $h6$ to $h1$ are arranged in a row in the order of the floors for successive engagement by a brush 41 as the elevator car moves from the upper terminal to its lower limit of travel.

During up travel of the elevator car A, the car-call stopping relay TT is connected between the brush 23 and the bus L— through make contacts W3 of the up-preference relay and make contacts M3 of the car-running relay. Consequently, when the brush 23 reaches one of the contact segments $a2$ to $a7$ which is connected to the bus L+, the car-call stopping relay TT is connected for energization across the buses L+ and L— for the purpose of stopping the elevator car at the next floor reached by the car. As the elevator car stops, the brush 23 preferably passes slightly beyond the associated contact segment.

When the elevator car A is conditioned for down travel, the car-call stopping relay TT is connected between the brush 41 and the bus L— through the make contacts X3 of the down-preference relay and the make contacts M3 of the car-running relay. Consequently, when the brush 41 reaches one of the contact segments $h6$ to $h1$ which is connected to the bus L+, the car-call stopping relay TT is energized to initiate a stopping operation of the elevator car at the next floor reached by the car. As the elevator car stops, the brush 41 preferably passes slightly beyond the associated contact segment.

The coils $1cc$ to $7cc$ are connected in series for energization either through make contacts W4 of the up-preference relay or make contacts X4 of the down-preference relay. When the elevator car reverses its direction of travel, the make contacts W4 and X4 both are momentarily opened to deenergize the associated holding coils for the purpose of resetting the car-call push buttons.

When the down floor-call push button 2D is operated, the down floor-call storing relay 2DR is connected therethrough across the buses L+ and L— for energization. Upon energization, the relay closes its make contacts 2DR1 to establish a holding circuit around the push button. The contact segment $f2$ now is connected (and corresponding contact segments for the remaining elevator cars are connected) through the contacts 2DR1 to the bus L+. The contact segments $f7$ to $f3$ similarly are connected to the bus L+ by operation of the down floor-call push buttons 7D to 3D. The contact segments $f7$ to $f2$ for the seventh to second floors are positioned in a row on the floor selector 19 of Fig. 1 for successive engagement by a brush 58 as the elevator car A moves from the upper terminal in a down direction.

The floor-call stopping relay K is connected between the bus L— and the brush 58 through make contacts X5 of the down-preference relay contacts UPK1 (which may be shunted by a switch 90) and the contacts PL1. Consequently, if the elevator car A approaches the second floor during a down trip while a down floor call is registered for such floor, the engagement of the contact segment $f2$ by the brush 58 completes an energizing circuit for the floor-call stopping relay K. Also, energization of the relay K requires closure of the contacts PL1. The contacts PL1 open when the elevator car is substantially loaded.

Each of the down floor-call storing relays 7DR to 2DR has not only an operating coil but a cancelling coil, respectively, 7DRN to 2DRN which is energized in opposition to the energization of the operating coil. The cancelling coil 2DRN is connected between a contact segment $g2$ (and similar contact segments $Bg2$ etc. for the other elevator cars) and the bus L+ through the make contacts 2DR1. As the elevator car A reaches the second floor, the following energizing circuit for the cancelling coil is established:

L+, 2DR1, 2DRN, $g2$, 59, X6, M4, L—

Energization of the coil 2DRN opposes energization of the relay by the operating coil and resets the relay. It will be understood that the contact segments $g7$ to $g2$ are arranged in a row for successive engagement by the brush 59 as the elevator car proceeds downwardly from the upper terminal floor to control the energization of the cancelling coils 7DRN to 2DRN.

The down floor-call storing relays all cooperate with the brushes 58 and 59 in substantially the same manner to control the energization of the floor-call stopping relay during down travel of the elevator car.

When the up floor-call push button 2U is operated, the up floor-call storing relay 2UR is connected for energization therethrough across the buses L+ and L—. Upon operation, the relay closes its make contacts 2UR1 to establish a holding circuit around the push button 2U. As a result, a contact segment $b2$ is connected (and contact segments $Bb2$ etc. for the other elevator cars are connected) to the bus L+ through such make contacts.

As the elevator car during up travel approaches the second floor, the brush 60 engages the contact segment $b2$ to establish the following energizing circuit for the floor-call stopping relay:

L+, 2UR1, $b2$, 60, W5, PD4 or switch 89, PL1, K, L—

This conditions the elevator to stop at the second floor. (If the switch 89 is open and the system is on down-peak operation with break contacts PD4 open, the foregoing circuit cannot be completed.) As the elevator car stops at the second floor, a brush 61 engages the contact segment $c2$ to establish the following circuit for the cancelling coil of the storing relay 2UR:

L+, 2UR1, 2URN, $c2$, 61, W6, M4, L—

Such energization of the cancelling coil results in resetting of the storing relay which has its main coil acting in opposition to the cancelling coil. The up floor-call buttons 1U to 6U similarly control the associated storing relays and contact segments. It will be understood that the contact segments $c1$ to $c6$ and contact segments $b1$ to $b6$ are arranged in rows on the floor selector for engagement successively by the brushes 61 and 60, as the elevator car A proceeds upwardly.

Inasmuch as the car stops at all times at the terminal floors the segments $b1$ and $f7$ may be omitted.

Figure 4:
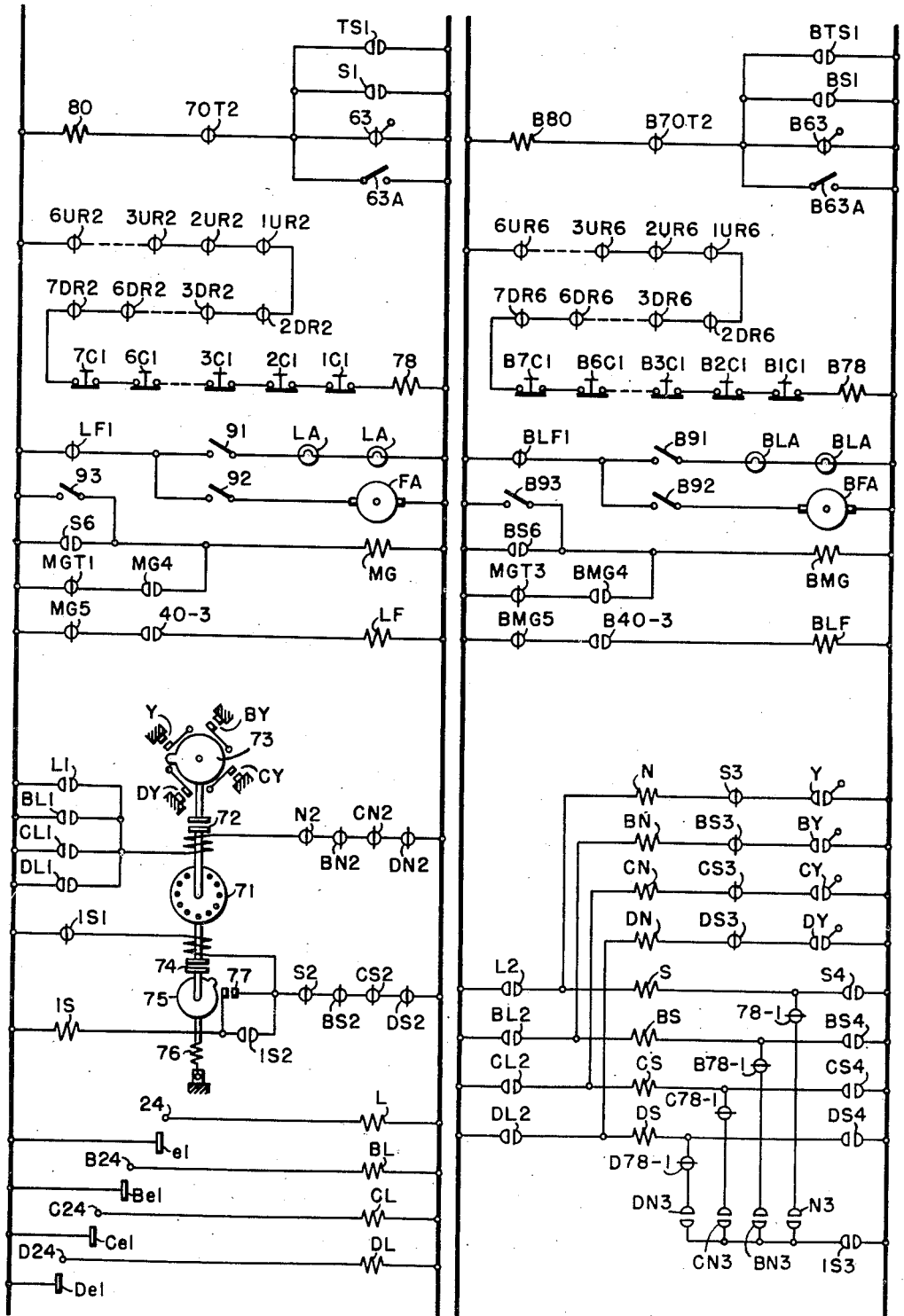
Figure 4A:
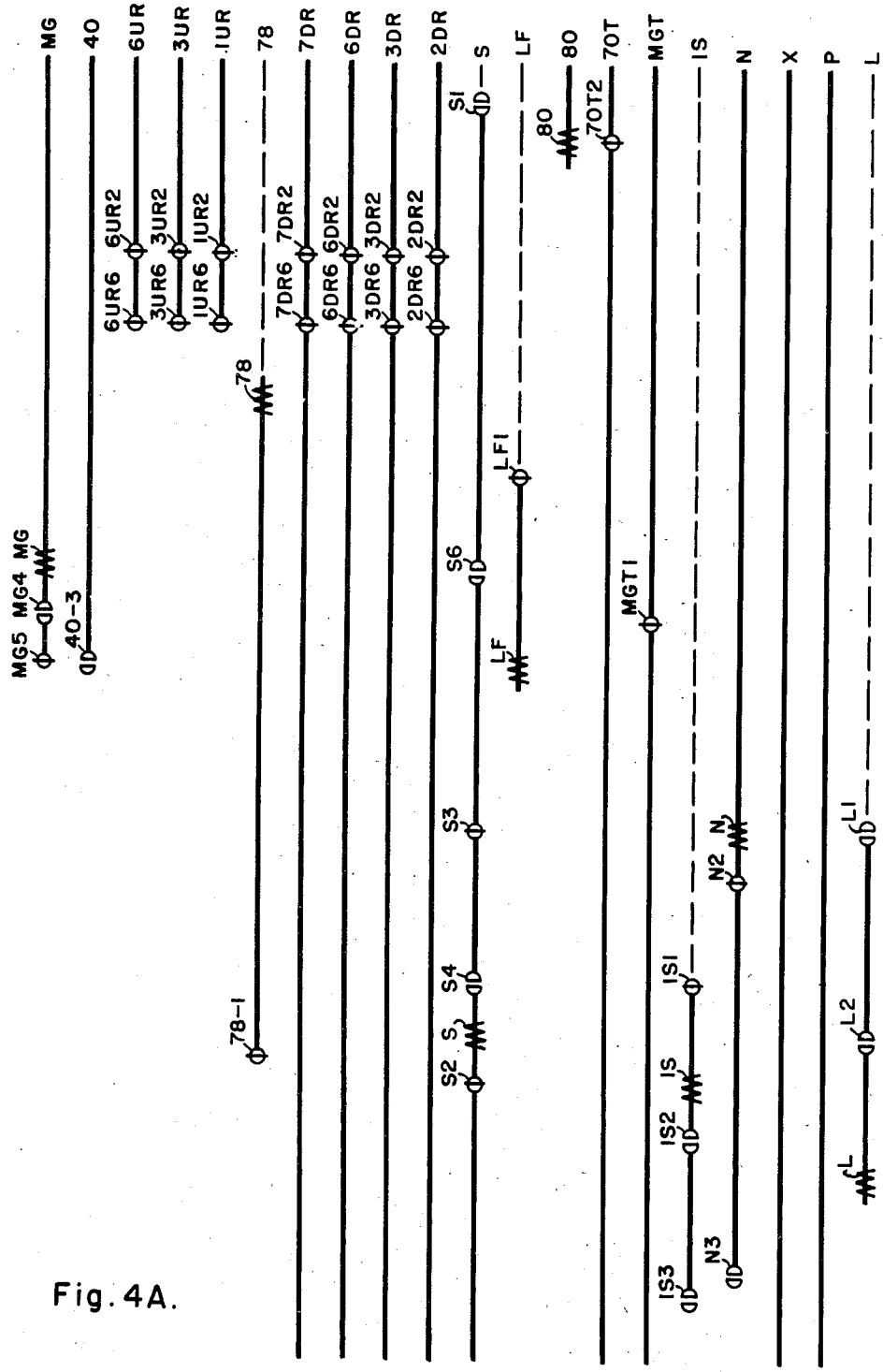

*Figure 4*

Fig. 4 shows the main starting relay 80, the call relay 78, the motor relay MG and the auxiliary control relay LF which are individual for each of the elevator cars. Fig. 4 also shows a dispatcher for controlling the dispatch of all of the elevator cars.

The starting relay 80 can be energized only if the timing relay 70T is deenergized and dropped out to close its break contacts 70T2. When the elevator car is positioned at the lower dispatching floor, the energizing circuit for the starting relay normally is completed through the make contacts S1 of an auxiliary starting relay. At the upper terminal or dispatching floor, make contacts TS1 may operate in a manner similar to the operation of the contacts S1 for the lower dispatching floor to start the elevator car from the upper terminal floor. Between the dispatching floors, the make contacts S1 are shunted by the contacts of a mechanical switch 63. This switch is cam operated to open when the elevator car is adjacent the upper dispatching floor and the lower dispatching floor. For all other positions of the elevator car A, the switch 63 is closed.

If dispatchers at the terminal floors are not required, a switch 63A may be manually closed to shunt the switch 63.

To indicate presence of one or more registered car or floor calls which may be answered by the elevator car A, break contacts of the floor call storing relays and contacts $1c1$ to $7c1$ of the car call push buttons are connected in series with the call relay 78, as clearly shown in Fig. 4.

Certain auxiliary equipment is associated with the elevator cars which may be shut down during periods of non-use. For exemplary purposes, it will be assumed that such auxiliary equipment includes lamps LA for illuminating the elevator car A and a fan FA which may be energized for the purpose of ventilating the elevator car A. The lamps and the fans may be energized only if break contacts LF1 of an auxiliary control relay LF are closed. In addition, energization of the lamps requires closing of a manually operated switch 91, whereas energization of the fans further requires closure of the manually operated switch 92.

The motor relay MG is energized for the purpose of starting the motor generator set of the elevator car A. Such energization may be effected by closure of a manually operated switch 93. If the switch 93 is open, the motor relay may be energized by closure of make contacts S6 of the auxiliary starting relay S. When the relay is picked up, it closes make contacts MG4 to establish with break contacts MGT1 of an auxiliary motor relay a self-holding circuit. For present purposes, it will be assumed that the manually operated switch 93 is closed in order to energize the motor relay MG.

Energization of the auxiliary control relay LF requires closure of the break contacts MG5 of the motor relay MG and closure of the make contacts 40-3 of the door relay 40. Consequently, this auxiliary control relay LF can be energized only if the motor relay MG is dropped out and if the doors of the elevator car A are closed.

In Fig. 4, a dispatching device is illustrated which normally controls the lower terminal dispatching of the elevator cars employed in the system.

The selection and timing mechanism include as one component a motor 71 which operates substantially at constant speed. This motor may be of any suitable type, but for present purposes it will be assumed that the motor is a squirrel-cage alternating current motor which is energized from a suitable source of alternating current. The motor 71 is connected through a spring-released electromagnetically-applied clutch 72 to a cam 73 having a protuberance for successively operating mechanical switches Y, BY, CY and DY which are associated with the respective elevator cars. The electromagnetic clutch can be energized only if one or more elevator cars are located at the dispatching floor which is assumed to be the first floor (one or more of the contacts L1, BL1, CL1, DL1 are closed), and if no elevator car has been selected as the next car to leave the dispatching floor (break contacts N2, BN2, CN2 and DN2 all are closed).

The motor 71 also may be coupled through a spring-released electromagnetically-applied clutch 74 to a cam 75 which is biased towards a predetermined position by a spring 76. The cam 75, when coupled to the motor 71, is rotated against the bias of the spring to close normally-open contacts 77 a predetermined time after the cam 75 is coupled to the motor 71. The clutch 74 can be electrically energized only if no elevator car is being started (break contacts S2, BS2, CS2, and DS2 are closed), and if the break contacts 1S1 of the holding relay 1S are closed. The holding relay 1S is energized upon closure of the contacts 77 to close its make contacts 1S2 for the purpose of establishing a holding circuit around the contacts 77.

The presence of an elevator car at the dispatching floor is determined by the energization of a car-position relay for each of the elevator cars. Thus, a car-position relay L for the elevator car A is energized when the brush 24 engages the contact segment e1.

The brush 24 is operated by the floor selector for the elevator car A to engage the contact segment e1 when the elevator car is at the dispatching floor.

If the elevator car A is at the dispatching floor (make contacts L2 are closed), if it has been selected as the next car to leave the dispatching floor (switch Y is closed), and if it is not being started (break contacts S3 are closed), the loading relay N for the elevator car A is energized. The loading relay may be employed in a conventional way to permit loading of the elevator car A. For example, the loading relay when energized may operate a loading signal, such as a lamp, which indicates that passengers may enter the elevator car. Conveniently, the loading relay N when energized opens the normally-closed doors of the elevator car A to permit entry of passengers into the elevator car.

After the expiration of a time sufficient for cam 75 to close the contacts 77 and energize the relay 1S, the make contacts 1S3 close to complete the following circuit:

$$L+, L2, S, 78-1, N3, 1S3, L-$$

The relay S when energized closes its make contacts S4 to establish a holding circuit around the contacts N3 and 1S3, and starts the elevator car A from the dispatching floor.

*Operation*

At this stage it appears advisable to consider the operation of the portion of the system thus far described. In order to explain the over-all operation of the elevator system, it will be assumed first that the elevator cars are at the first or dispatching floor and that no call has been registered for a substantial time. The cars are conditioned for operation in the up direction. For example, the elevator car A has its up-preference relay W energized. Consequently, make contacts W1, W3, W4, W5, W6 of the relay are closed, whereas break contacts W2 of the relay are open. Switch 81 (Fig. 2) is assumed to be open. The call relay 78 is energized and picked up.

It will be assumed further that at the time the system was last deenergized the elevator car A was selected as the next car to leave the dispatching floor and its doors are open. At this stage, it will be assumed that an intending passenger at the seventh floor operates the push button 7DR to register a call. Such operation energizes the relay 7DR which closes its self-holding contacts 7DR1 and opens its contacts 7DR2 to deenergize the call relay 78. The deenergized call relay closes its contacts 78-1 without immediate effect on the operation of the system. The relay 7DR also closes its contacts 7DR3, 7DR4 and 7DR5 and the effects of such closures will be considered below.

The motor relay MG is assumed for the present to be energized through the switch 93 and the motor generator set is operating. The switches 91, 92 are assumed to be closed. The lamps LA and the fan FA are energized.

The switch 63A (Fig. 3) is assumed to be open. Since the cars are at the first floor, the switch 63 is open. The timing relay 70T is assumed to have timed out. The relays 45 and 40 are dropped out and the elevator car doors are open.

The motor 71 (Fig. 4) is energized to rotate at a substantially constant rate.

The sequence by which the doors of the car A were opened now will be considered. When the elevator car A last reached the lower terminal floor the car-position relay L was energized and picked up. It is assumed that no other elevator car is selected to leave the lower terminal floor.

As a result of its energization, the car-position relay L closes its make contacts L2 to prepare certain circuits for subsequent energization. In addition, the make contacts L1 close to complete the following circuit for the clutch 72:

$$L+, L1, 72, N2, BN2, CN2, DN2, L-$$

The clutch now couples the motor 71 to the cam 73 for the purpose of successively closing and opening the associated mechanical switches. It will be assumed that the first switch reached by the cam is the switch Y for the elevator car A. Closure of this switch completes the following energizing circuit for the loading relay of the elevator car A:

L+, L2, N, S3, Y, L—

The loading relay N upon energization initiates opening of normally-closed doors of the elevator car A to permit intending passengers on the dispatching floor to enter the elevator car. Such opening is effected by opening of contacts N1 (Fig. 2) to deenergize the door-control relay 45. This relay opens its contacts 45–1 and 45–2 without immediate effect on system operation. However, closure of contacts 45–3 energizes the solenoid DO to open the doors. The solenoid DO also closes its contacts DO1 to energize the timing relay 70T before the timing relay can drop out.

In opening, the door opens its set of contacts 33 to deenergize the door relay 40 which opens its contacts 40–1 and 40–3 and closes its contacts 40–2 without immediate effect on system operation. When it reaches open position, the door opens limit switch 38 to deenergize the solenoid DO. The solenoid DO opens its contacts DO1 to initiate a timing out operation of the timing relay 70T.

Opening of the break contacts N2 (Fig. 4) deenergizes the clutch 72. Consequently, the cam 73 is uncoupled from the motor 71. Finally, the make contacts N3 close to prepare the starting relay S for subsequent energization.

Upon expiration of its timing period the relay 70T drops out to close its break contacts 70T1, 70T2, 70T3 and 70T5 and to open its make contacts 70T4 and 70T6. The closures of 70T1 and 70T2 prepare circuits for subsequent operation. The operation of contacts 70T3, 70T4, 70T5 and 70T6 will be discussed in connection with Figs. 5 and 8.

When the system was placed in operation, the clutch 74 was energized through the circuit:

L+, 1S1, 74, S2, BS2, CS2, DS2, L—

As a result of its coupling to the motor 71, the cam 75 rotates against the bias of its spring 76 until at the expiration of the time interval allowed for loading elevator cars the contacts 77 close. Closure of these contacts completes the following circuit:

L+, 1S, 77, S2, BS2, CS2, DS2, L—

The energized relay 1S closes its make contacts 1S2 to establish a holding circuit around the contacts 77. The break contacts 1S1 open to deenergize the clutch 74, and the spring 76 now rotates the cam to its starting position. Also, the make contacts 1S3 close to energize the auxiliary starting relay S through the following circuit:

L+, L2, S, 78–1, N3, 1S3, L—

Energization of the auxiliary starting relay S closes the make contacts S4 to establish a holding circuit around the contacts N3 and 1S3. Break contacts S3 open to deenergize the loading relay N. Break contacts S2 open, and this opening causes relay 1S to drop out. This has no immediate effect on the system operation.

The loading relay when deenergized opens its make contacts N3 without immediate effect on the operation of the system. In addition, break contacts N2 close to prepare the clutch 72 for subsequent energization.

The deenergization of the loading relay further closes break contacts N1 (Fig. 2) to complete with the contacts 70T1 an energizing circuit for the door-control relay 45. The latter relay closes its make contacts 45–1 and opens its break contacts 45–3 without immediate effect on system operation. However, closure of make contacts 45–2 completes with the contacts 40–2 an energizing circuit for the door-close solenoid DC, and the door now starts to close.

Upon closing, the door closes its switch 33 to complete an energizing circuit for the door relay 40 which closes its make contacts 40–1 and opens its break contacts 40–2 to deenergize the door-close solenoid DC.

Turning now to Fig. 4, it will be noted that closure of the make contacts S1 result from energization of the auxiliary starting relay S. Inasmuch as the elevator car A is assumed to have remained at the dispatching floor for a time sufficient to permit closure of the break contacts 70T2, an energizing circuit now is complete for the main starting relay 80.

The previously mentioned closure of contacts 40–1 of the door relay (Fig. 2) coupled with closure of the make contacts 80–1 of the starting relay completes the following circuit for the up switch and the car-running relay:

L+, 80–1, W1, F1, 34, U, M, 40–1, L—

The energized up switch U closes its make contact U1 to release the brake 17, and contacts U2 and U3 close to energize the generator field winding 29C with proper polarity for up travel of the elevator car. Make contacts U4 close to complete through the limit switch 30 and the contacts E1 an energizing circuit for the speed relay V. The speed relay closes its make contact V1 to shunt the resistor R1 and condition the elevator car A for full speed operation in up direction. Also, the speed relay opens its break contacts V2 to prevent energization therethrough of the stopping inductor relay F.

Returning to the up switch U, it will be noted that closure of the make contacts U5 establishes a holding circuit around the contacts 80–1 and W1. Opening of the break contacts U6 prevents energization therethrough of the down preference relay. The elevator car A now is in condition for full speed operation in the up direction and departs from the dispatching floor.

It will be recalled that the car-running relay M was energized with the up switch U. The car-running relay closed its make contacts M1, M3 and M4 (Fig. 3) without immediate effect on the operation of the system. However, closure of the make contacts M2 (Fig. 2) completes with the contacts 45–1 and N1 a holding circuit for the door-control relay 45. Closure of the make contacts M5 energizes the timing relay 70T. This relay opens its break contacts 70T2 (Fig. 3) which causes the starting relay 80 to become deenergized. Opening of break contacts 70T1 (Fig. 2) has no immediate effect. The effect of opening of break contacts 70T3 and closure of make contacts 70T4 will be discussed in connection with Fig. 5.

It will be assumed now that the passenger in the elevator car operates the car-call push button 3c (Fig. 2) to register a car call for the third floor. Such operation connects the contact segments a3 and h3 to the bus L+. In addition, contacts 3c1 open in the circuit for the call relay 78. The effect of operation of the contacts 3c2 and 3c3 will be considered below.

As the elevator car nears the third floor, the brush 23 engages the contact segment a3 to complete the following circuit for the car-call stopping relay TT:

L+, 3c, a3, 23, W3, TT, M3, L—

The car-call stopping relay now closes its make contacts TT1 (Fig. 2) to energize the holding relay G and the slow-down inductor relay E through the closed contacts M1. Energization of the holding relay G completes through the make contacts G1 a holding circuit around the contacts TT1.

When the elevator car A in its upward travel reaches the inductor plate UEP (Fig. 1) for the third floor, the break contacts E1 are opened to deenergize the speed relay V (Fig. 2). The speed relay opens its break contact V1 to introduce the resistor R1 in series with the the generator field winding 29C. The resultant reduction in field current slows the elevator car to a landing speed. In addition, the speed relay V closes its break contacts V2 to complete through the contacts G1 and M1 and energizing circuit for the stopping inductor relay F.

Shortly before the elevator car A in its continued upward movement at the landing speed reaches the third floor, the inductor plate UFP for the third floor is adjacent the stopping inductor relay and completes a magnetic circuit which results in opening of the contacts F1. Opening of the contacts F1 (Fig. 2) deenergizes the up switch U and the car-running relay M.

The up switch U opens its make contacts U1 to deenergize the brake 17, and the brake is promptly forced against the brake drum 16 by its associated spring. Contacts U2 and U3 open to deenergize the generator field winding 29C. Consequently, the elevator car A stops accurately at the third floor. Opening of the make contacts U4 and U5 and closure of the break contacts U6 have no immediate effect on the operation of the system. As the elevator car comes to a stop the brush 23 may pass the contact segment for a slight distance to deenergize the relay TT.

The previously-mentioned deenergization of the car-running relay resulted in opening of the make contacts M1 to deenergize the inductor relays E and F and the holding relay G. The holding relay G opened its make contacts G1 without immediately affecting the operation of the system.

The car-running relay also opened its make contacts M5 to start a timing-out operation of the timing relay 70T. This relay has a time delay in drop out sufficient to permit discharge of passengers or entry of passengers into the elevator car A. For example, a time delay of three seconds may be employed. Opening of the make contacts M3 and closure of the break contacts M4 have no immediate effect on the operation of the system.

Opening of make contacts M2 deenergizes the door control relay 45 and this relay opens its make contacts 45–1 and 45–2 without immediate effect on system operation. However, closure of break contacts 45–3 completes with the switch 38 a circuit for the door-open solenoid DO and the door now opens. The solenoid DO also closes its contacts DO1 to reenergize the timing relay 70T prior to drop out of the timing relay. However when the door reaches its open position the switch 38 opens to deenergize the solenoid DO and the contacts DO1 open to permit the timing relay to time out. In opening, the door opens its switch 33 to deenergize the door relay 40 without immediate effect on system operation.

Let it be assumed that instead of a car call, an up floor call was registered for the third floor by operation of the push button 3U (Fig. 3). Such operation energizes the up floor call storing relay 3UR which closes its make contacts 3UR1 to establish a holding circuit around the push button. The contacts 3UR1 also serve to connect the contact segment $b3$ and corresponding contact segments for the remaining elevator cars of the system to the bus L+. Contacts 3UR2 open in the circuit of the call relay 78. The effect of closure of the contacts 3UR3, 3UR4, 3UR5 will be treated below.

As the elevator car approaches the third floor, the brush 60 engages the contact segment $b3$ to energize the floor-call stopping relay K through the following circuit:

L+, 3UR1, $b3$, 60, PD4, W5, PL1, K, L—

Upon energization, the floor call stopping relay closes its make contacts K1 (Fig. 2) to energize through the contacts M1 the holding relay G and the slowdown inductor relay E. These relays operate in the same manner previously discussed to stop the elevator car accurately at the third floor.

As the elevator car A slows down to stop at the third floor, the brush 61 engages the contact segment $c3$ to complete the following cancelling circuit:

L+, 3UR1, 3URN, $c3$, 61, W6, M4, L—

It will be recalled that the break contacts M4 close as the elevator car stops at the third floor. As a result of its energization, the cancelling coil 3URN resets the up floor-call storing relay for the third floor.

Referring to Fig. 4, it will be recalled that the mechanical switch 63 is open only at the dispatching-floor and the upper-terminal-floor positions of the elevator car. Since the elevator car is now at the third floor, the switch 63 is closed. Consequently, as soon as the timing relay 70T drops out, the break contacts 70T2 close to complete an energizing circuit for the starting relay 80. This operates in the manner previously discussed to start the elevator car upwardly. In this way, the elevator car A continues to the upper terminal floor, answering all registered car calls and all registered up floor calls during its upward trip.

As the elevator car A approaches the upper terminal or seventh floor, the brush 23 (Fig. 2) engages the contact segment $a5$ to complete the following energizing circuit for the car-call stopping relay:

L+, $a5$, 23, W3, TT, M3, L—

The car-call stopping relay operates in the manner previously discussed to stop the elevator car accurately at the upper-terminal floor.

As the elevator car A reaches the upper-terminal floor, the mechanical switch 63 (Fig. 4) opens. Consequently, the elevator car A cannot start from the upper-terminal floor until it is started by its upper-terminal dispatching device represented by the contacts TS1. It will be understood that the upper-terminal dispatching device may be similar to the dispatching device discussed for the first floor. For present purposes it will be assumed that the contacts TS1 operate for the upper-terminal dispatching floor in the same manner by which the contacts S1 operate for the lower dispatching floor.

As the elevator car reaches the seventh floor, the limit switch 36 (Fig. 2) opens to deenergize the up-preference relay W. This relay opens its make contacts W1, W3, W5, W6, without immediately affecting the operation of the system. However, opening of the make contacts W4 deenergizes the holding coils for the car-call push buttons, and these are reset. In addition, closing of the break contacts W2 completes the following energizing circuit for the down-preference relay:

L+, U6, W2, X, 37, L—

The down-preference relay X closes its make contacts X1, X3, X4, X5, X6, X7, X9 and X10 and opens its break contacts X2 and X8 to condition the elevator car for down travel.

It will be assumed next that the dispatching device for the upper terminal floor closes its contacts TS1 (Fig. 4) and that the timing relay has closed its break contacts 70T1 to complete an energizing circuit for the starting relay 80. The loading relay of the dispatching device for the upper-terminal floor operates the contacts TN1 to control the door-control relay 45 in the same manner by which contacts N1 control the door-control relay at the lower terminal floor. The closing of the doors coupled with the closing of the make contacts 80–1 completes the following circuit for the down switch D and the car-running relay M:

L+, 80–1, X1, F2, 35, D, M, 40–1, L—

The car-running relay M operates in the manner previously described to prepare certain circuits for subsequent operation.

Upon energization, the down switch D closes its make contacts D1 to release the brake 17. In addition, make contacts D2 and D3 close to energize the generator field winding 29C in the proper direction for down travel of the elevator car. Closure of the make contacts D4 completes an energizing circuit for the speed relay V. This relay closes its make contacts V1 to shunt the resistor R1 and opens its break contacts V2. The elevator car now is conditioned for movement in the down direction at full speed and moves away from the upper terminal floor.

Closure of make contacts D5 establishes a holding circuit around the contacts 80–1 and X1. Opening of break contacts D6 has no immediate effect on the operation of the system.

It will be understood that as the elevator car leaves the upper terminal floor, the limit switch 35 (Fig. 2) and the switch 63 (Fig. 3) reclose.

It will be assumed next that a passenger in the elevator car operates the car-call push button 3c for the purpose of registering a car call for the third floor. This button connects the contact segments a3 and h3 to the bus L+. Contacts 3c1 open in the circuit of the call relay 78. The momentary operation of contacts 3c2 and 3c3 will be considered below.

When the brush 41 reaches the contact segment h3, an energizing circuit is established for the car-call stopping relay TT as follows:

L+, 3c, h3, 41, X3, TT, M3, L—

Consequently, the relay closes its make contacts TT1 to energize through the contacts M1 the holding relay G and the inductor relay E. The holding relay G closes its make contacts G1 to establish a holding circuit around the contacts TT1.

When the slowdown inductor relay E reaches the inductor plate DEP for the third floor (Fig. 1), the contacts E2 open to deenergize the speed relay (Fig. 2). The speed relay opens its make contacts V1 to introduce the resistor R1 in series with the generator field winding 29C. The elevator car now slows to a landing speed. In addition, the break contacts V2 close to complete an energizing circuit for the stopping inductor relay F.

When the stopping inductor relay F reaches the inductor plate DFP for the third floor, the contacts F2 open to deenergize the down switch D and the car-running relay M. The down switch D opens its make contacts D1 to permit reapplication of the brake 17. Make contacts D2 and D3 open to deenergize the generator field winding, and the elevator car A stops accurately at the third floor. Opening of the make contacts D4 and D5 and closing of the break contacts D6 have no immediate effect on the operation of the system. As the elevator car comes to a stop the brush 40 may pass the contact segment h3 slightly to deenergize the relay TT.

The car-running relay M opens its make contacts M1 to deenergize the inductor relays and the holding relay G. The holding relay G in turn opens its make contacts G1 to prevent subsequent energization therethrough of the inductor relays.

The make contacts M2 open to initiate an opening operation of the doors. The opening and closing of the doors will be understood from the previous discussion thereof.

The car-running relay M also opens its make contacts M5 and this is followed by closing and opening of the contacts DO-1 to start a timing-out operation of the timing relay 70T. Opening of make contacts M3 and M5 and closing of break contacts M4 have no immediate effect on the operation of the system. When the timing relay 70T drops out, the break contacts 70T2 (Fig. 3) close to energize through the switch 63 the starting relay 80. The starting relay operates in the manner previously described to start the elevator car down from the third floor.

Let it be assumed that instead of a car-call a down floor call was registered for the third floor by operation of the push button 3D (Fig. 3). Such operation energizes the down floor-call storing relay 3DR which closes its make contact 3DR1 to establish a holding circuit around the push button 3D. The contact segment f3 and corresponding contact segments for the remaining elevator cars of the system are connected through the make contacts 3DR1 to the bus L+. Contacts 3DR2 in the circuit of the call relay 78 opens and similar contacts open in circuits for the call relay of other cars. The effect of operation of the contacts 3DR3, 3DR4 and 3DR5 will be considered below.

As the elevator car A approaches the third floor in the down direction, the brush 58 reaches the contact segment f3 to complete an energizing circuit for the floor call stopping relay K as follows:

L+, 3DR1, f3, 58, X5, UPK1 or switch 90, PL1, K, L—

The relay K closes its make contacts K1 (Fig. 2) to energize the holding relay G and the slowdown inductor relay E through the contacts M1. These relays operate in the manner previously described to stop the down traveling elevator car at the third floor.

During the stopping operation, the following cancelling circuit (Fig. 3) is established:

L+, 3DR1, 3DRN, g3, 59, X6, M4, L—

As a result of energization of the cancelling coil 3DRN, the down floor call storing relay 3DR is reset.

When the elevator car in its down travel nears the first or dispatching floor, the brush 41 (Fig. 2) engages the contact segment h1 to complete the following circuit.

L+, h1, 41, X3, TT, M3, L—

The energization of the car-call stopping relay TT stops the elevator car at the first floor in the same manner discussed with reference to the stopping of the elevator car at the third floor.

As the elevator car A stops at the first floor, the mechanical switch 37 opens to deenergize the down-preference relay X. This relay opens its make contacts X1, X3, X5, X6, X7, and X9 without immediately affecting the operation of the system. However, closure of the break contacts X2 completes an energizing circuit for the up-preference relay W. This operates in the manner previously discussed to condition the elevator car for up travel. Break contacts X8 also close without affecting system operation at this time.

It will be noted that as the relay X is deenergized the make contacts X4 and W4 are open until the up-preference relay W is again energized. During this momentary opening of both sets of contacts, the holding coils for the car-call push button are deenergized to reset the buttons.

The operation of the system thus far has been based on the assumption that the manually operated switch 93 (Fig. 4) is closed to energize the motor relay MG. The modification in operation of the system resulting from opening of the switch 93 now will be considered.

With the switch 93 open, energization of the start relay S results in closure of the make contacts S6 to energize the motor relay MG. As previously pointed out, such energization results in starting of the motor generator set. In addition, make contacts MG4 close to establish with the break contacts MGT1 a self-holding circuit for the motor relay MG. The relay consequently remains energized until the break contacts MGT1 open. The conditions under which the break contacts MGT1 open will be considered in connection with the description of Fig. 5.

Figure 5:
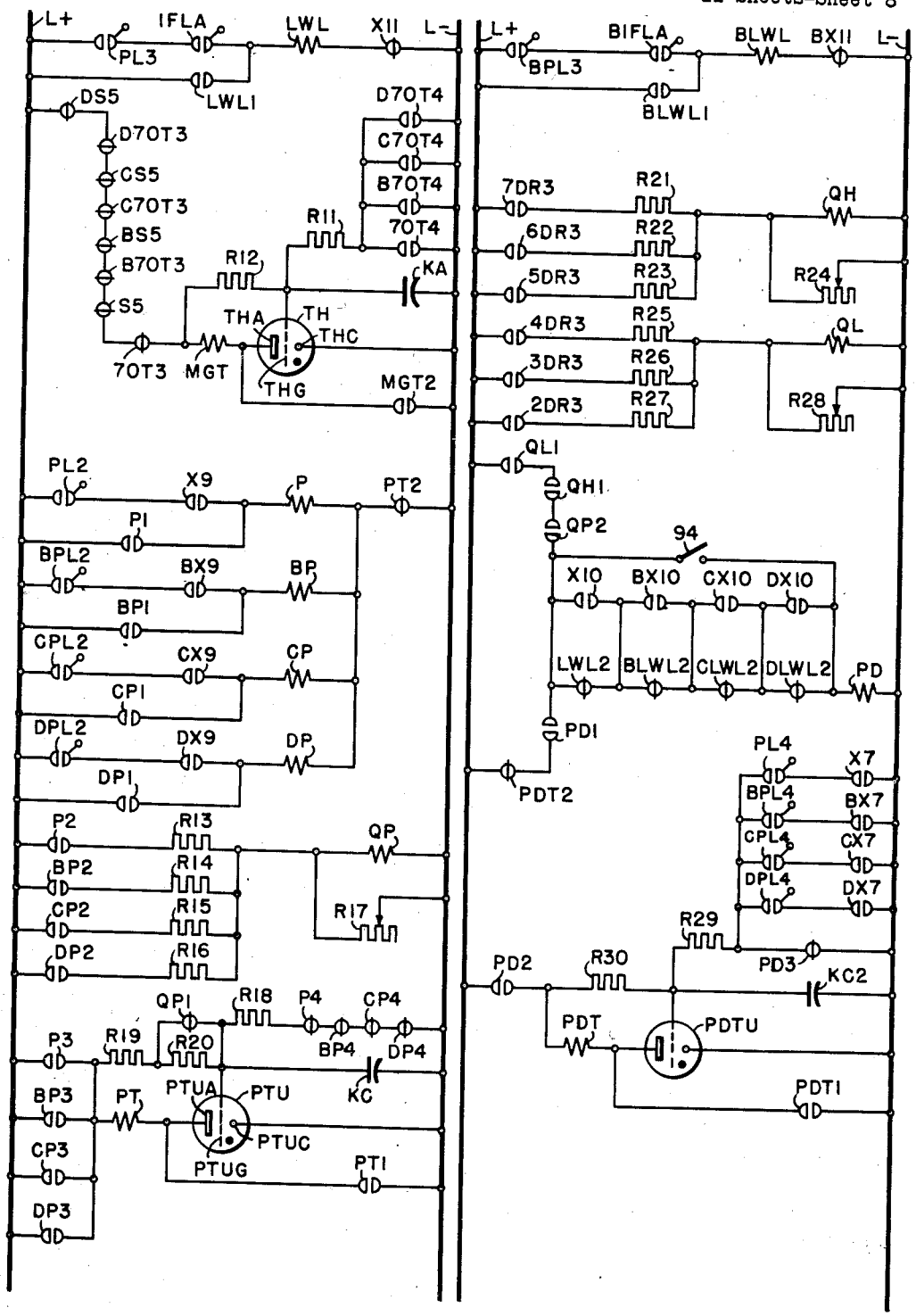
Figure 5A:
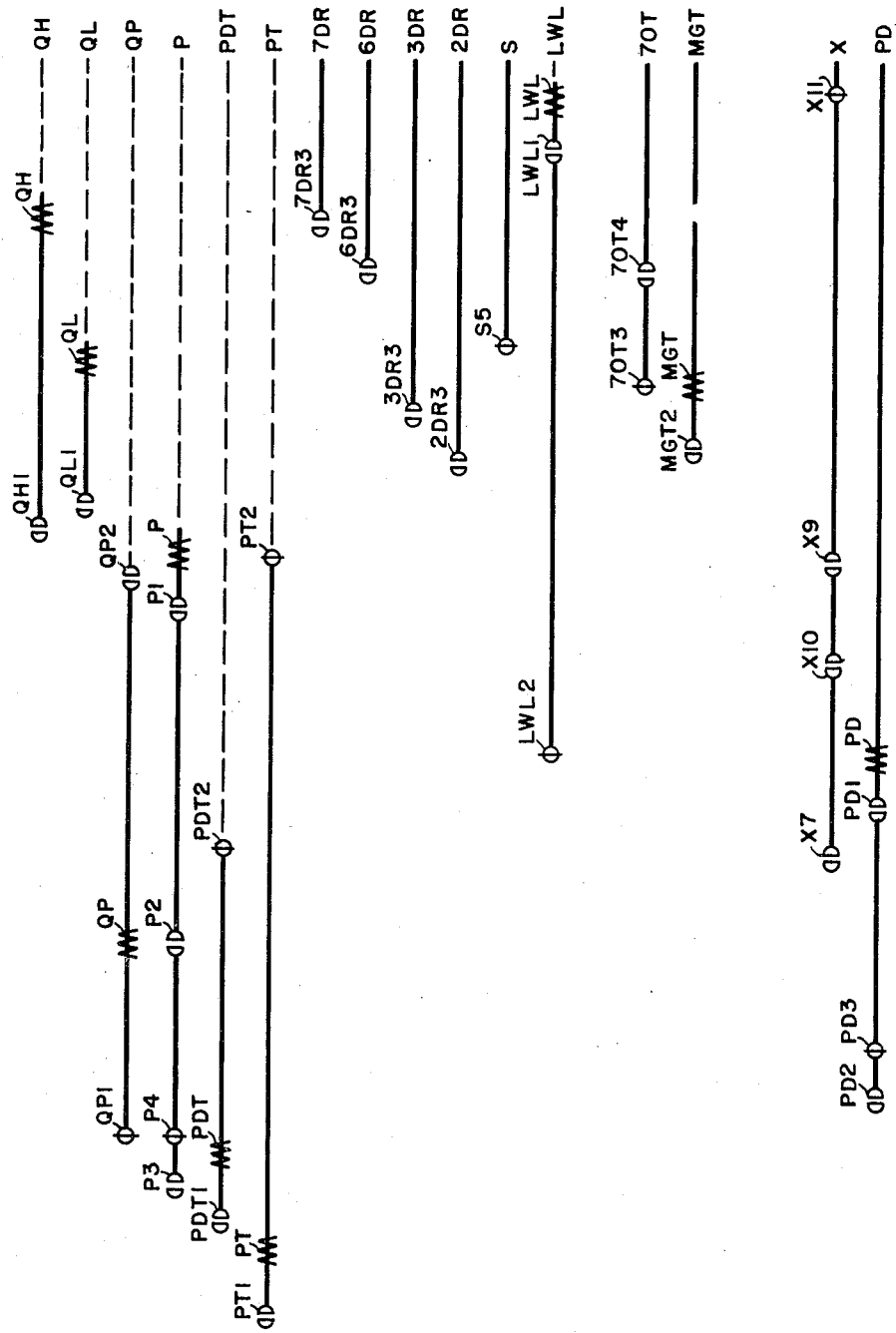

*Figure 5*

A separate light-load relay is provided for each of the cars. Thus, for the elevator car A a light-load relay LWL is energized through the load-weighing contacts PL3, a normally-open switch 1FLA which is closed only when the elevator car A is at the lower terminal floor, and break contacts X11 of down-preference relay. When it picks up, the relay LWL closes make contacts LWL1 to establish with the contacts X11 a self-holding circuit. The relay LWL picks up when the elevator car is loaded in excess of 30% of capacity at the lower terminal floor and remains picked up until the elevator car reaches the upper terminal floor to open the contacts X11.

The left-hand part of Fig. 5 next shows the control circuits for the auxiliary motor relay MGT common to all cars. These circuits include an electronic control device having a main current path which may be controlled by means of a control circuit. The electronic device may be of various forms, such as high vacuum, electronic tubes or gaseous-discharge tubes employing hot or cold cathodes. For present purposes, it will be assumed that a gaseous discharge tube TH having a cold cathode and referred to as a cold-cathode thyratron is employed. This tube TH has an anode THA, a cathode THC, and a control electrode or grid THG. The cathode THC is connected directly to the negative bus L—. The anode THA is connected to the positive bus L+ through a circuit including in series the auxiliary motor relay MGT, break contacts 70T3, B70T3, C70T3 and D70T3 of the timing relays for all of the elevator cars of the system and break contacts S5, BS5, CS5, and DS5 of the auxiliary starting relays for all of the elevator cars of the system. Consequently, if the non-interference time for any of the elevator cars has not timed out or if any of the elevator cars has a start signal the relay MGT cannot be energized.

The tube TH is employed for introducing a time delay which is determined by the charge of a capacitor KA connected between the control and cathode electrodes of the tube. This capacitor is energized through the following circuit:

L+, DS5, D70T3, CS5, C70T3, BS5, B70T3, S5, 70T3, R12, KA, L—

When this circuit is completed the rate of build-up of voltage on the capacitor is determined by the size of the capacitor and the value of resistance in the resistor R12.

In order to discharge the capacitor, a resistor R11 is connected thereacross through any of four sets of make contacts 70T4, B70T4, C70T4, D70T4.

The operation of the auxiliary motor relay MGT now will be considered. It will be assumed that the elevator cars are all located at the lower terminal floor and that all of the motor generator sets are shut down. The elevator car A is assumed to be selected as the next car to leave the lower terminal floor.

It will be assumed further that all the elevator cars have remained at the terminal floor for a time sufficient to permit all of the time relays to have timed out, and that the following charging circuit for the capacitor KA has been completed for a time sufficient to charge the capacitor:

L+, DS5, D70T3, CS5, C70T3, BS5, B70T3, S5, 70T3, R12, KA, L—

As a result of the charging of the capacitor KA, the tube TH has fired to energize the auxiliary motor relay MGT. This relay closes its self-holding contacts MGT2 which shunt the tube TH. In addition, break contacts MGT1 (Fig. 4) open to interrupt the holding circuit for the motor relay MG.

At this stage it will be assumed that a call is registered requiring departure of the elevator car A and that the auxiliary starting relay S of the elevator car A is energized by the sequence previously discussed. As a result of its energization, the auxiliary starting relay closes its make contacts S6 to energize the motor relay MG. The motor generator set of the elevator car A now starts and the make contacts MG4 close. The energization of the auxiliary starting relay also results in opening of the break contacts S5 to deenergize the auxiliary motor relay MGT. The relay MGT opens its self-holding contacts MGT2 without immediate effect on the operation of the system. Closure of the break contacts MGT1 (Fig. 4) completes with the now-closed make contacts MG4 a self-holding circuit for the motor relay MG.

It will be recalled that as the elevator car A starts, the timing relay 70T is energized. This relay opens its break contacts 70T3 (Fig. 5) to prevent energization therethrough of the auxiliary motor relay MGT and of the capacitor KA. In addition, make contacts 70T4 close to complete with the resistor R11 a discharge circuit for the capacitor KA and the capacitor now discharges.

In an analogous manner, if the demand for service continues, the auxiliary starting relay for the elevator car B closes its make contacts BS6 to energize the motor relay BMG for the purpose of starting the motor generator set of the elevator car B. The motor relay BMG also closes its make contacts BMG4 to establish with the break contacts MGT3 a self-holding circuit for the motor relay. The starting of the elevator car B is accompanied by opening of the break contacts B70T3 (Fig. 5) and closing of the make contacts B70T4 without immediate effect on the operation of the system.

Let it be assumed next that the elevator car A returns to the lower terminal floor and remains at such floor for a time sufficient to permit drop-out of its timing relay 70T. This relay closes its break contacts 70T3 and opens its make contacts 70T4 without immediate effect on the operation of the system.

It will be assumed that the elevator car B now returns to the lower terminal floor and remains there for a time sufficient to permit drop-out of the timing relay B70T. As a result of this drop-out, the make contacts B70T4 open to interrupt the discharge circuit for the capacitor KA. In addition, the break contacts B70T3 close to complete the following energizing circuit for the capacitor KA:

L+, DS5, D70T3, CS5, C70T3, BS5, B70T3, S5, 70T3, R12, KA, L—

The capacitor KA now starts to charge. At the end of the time delay for which the circuit is designed, the voltage across the capacitor KA raises the control electrode THC to a bias sufficiently positive relative to the cathode to initiate a discharge in the tube, and auxiliary motor relay MGT now is energized through the following circuit:

L+, DS5, D70T3, CS5, C70T3, BS5, B70T3, S5, 70T3, MGT, THA, THC, L—

The relay MGT closes its self-holding contacts MGT2. In addition, the relay opens its break contacts MGT1 and MGT3 (Fig. 4) to interrupt the energization of the motor relays MG and BMG. The deenergization of the motor relays results in shutdown of the motor generator sets for the elevator cars A and B.

From this discussion it is clear that with the switches 93 and B93 open and with all of the elevator cars parked at the lower terminal floor with the motor generator sets shut down, each of the elevator cars which is to be started has its motor generator set placed in operation and each of the motor generator sets thereafter remains in operation until all of the elevator cars have again parked at the lower terminal floor for a substantial time. Such a construction would permit substantially continuous operation of the motor generator sets during a business day while permitting shutdown of the motor generator sets during off-hour periods.

The remainder of Fig. 5 is directed to circuits controlling the transfer of the elevator system to down-peak operation. Each of the elevator cars has a load relay P, BP, CP and DP and these relays can be energized only if the break contacts PT2 of a load time relay are closed. In addition, for initial operation of the relay P the make contacts X9 must be closed to indicate that the elevator car A is set for down travel and the switch PL2 must be closed to indicate that the elevator car A is fully loaded. If the load relay P is once energized it closes its make contacts P1 to establish with the break contacts PT2 a self-holding circuit. Energization of each of the load relays for the remaining elevator cars is effected in a similar manner and the energizing circuits are clearly illustrated in Fig. 5. Consequently, each of the load relays is energized only if the elevator car with which it is associated is fully loaded while set for travel in the down direction and consequently indicates that the elevator car is bypassing in the down direction.

Closure of the make contacts P2 of the load relay P establishes an energizing circuit for an auxiliary load relay QP through a resistor R13. In an analogous manner closure of the make contacts BP2, CP2 and DP2 completes energizing circuits for the auxiliary relay QP, respectively, through resistors R14, R15 and R16.

A resistor R17 is connected in shunt across the relay QP. By adjustment of this resistor the relay QP may be adjusted to pick up in response to closure of at least a predetermined number of the contacts P2, BP2, CP2 and DP2. For example, the relay may be designed to pick up when energized through any one of the aforesaid sets of contacts. However, for present purposes, it will be assumed that the auxiliary load relay QP picks up only when energized through two or more of the resistors R13 to R16.

The load relays also control the operation of a timing circuit. The timing circuit may be of any suitable construction but is illustrated as including an electronic tube PTU. This tube may be similar to the tube TH previously described. Thus, the tube includes an anode PTUA, a cathode PTUC and a control electrode or grid PTUG. The cathode of the tube is connected directly to the bus L—, whereas the anode is connected to the bus L+ through a load time relay PT and any one of four sets of make contacts P3, BP3, CP3 and DP3 of the load relays.

The firing of the tube PTU is controlled by a capacitor KC which is connected between the control and cathode electrodes of the tube. The capacitor has a discharge circuit which includes in series a resistor R18 and break contacts P4, BP4, CP4 and DP4 of the load relays.

If the contacts P3 are closed, the capacitor KC is charged through the following circuit:

L+, P3, R19, R20, KC, L—

The resistors R19 and R20 determine the rate at which the capacitor charges. As shown in Fig. 5, the resistor R20 is shunted by break contacts QP1 of the auxiliary load relay QP. When the load-time relay PT picks up, it establishes a self-holding circuit around the tube PTU through the make contacts PT1.

The demand for service in the down direction is also measured in part by means of a first quota relay QH and a second quota relay QL. The first quota relay QH is responsive to the number of registered down floor calls in a high zone of floors which here is assumed to contain the fifth, sixth and seventh floors. It will be noted that the relay QH is energized through a parallel circuit having three arms, one for each of the associated floors. Each of the arms includes a resistor and make contacts of the down floor call storing relay for the associated floor. Thus, for the seventh floor the arm includes the make contacts 7DR3 and the resistor R21.

In order to adjust the number of down floor calls necessary to effect pickup of the relay QH an adjustable resistor R24 is connected across the relay. For present purposes, it will be assumed that this relay is adjusted to pick up in response to registration of two or more down floor calls in the high zone.

The second quota relay QL is energized in accordance with the number of down floor calls registered in a low zone of floors which is assumed to include the second, third and fourth floors. This relay can be energized through a parallel circuit having three arms, each including a resistor and a set of make contacts on the down floor call storing relay for the associated floor. An adjustable resistor R28 is connected across the relay QL. For present purposes, it will be assumed that the relay QL is adjusted to pick up when energized through two or more of the resistors R25, R26 and R27.

The contacts QH1 of the first quota relay, QL1 of the second quota relay and QP2 of the auxiliary load relay are connected in series with a manually operated switch 94 for the purpose of controlling the energization of a down-peak relay PD. Consequently, if the manually operated switch 94 is closed, the down-peak relay PD is energized if the make contacts QL1 are closed to indicate that at least a predetermined number of down floor calls are registered in a low zone of floors, make contacts QH1 are closed to indicate that at least a predetermined number of down floor calls are registered in a high zone of floors, and make contacts QP2 are closed to indicate that the elevator cars when set for travel in the down direction are bypassing at a predetermined rate. When the down-peak relay PD picks up, it closes make contacts PD1 to establish with the break contacts PDT2 a self-holding circuit. Consequently, the system remains on down-peak operation until the break contacts PDT2 open.

The down-peak relay also closes make contacts PD2 to connect in series across the buses L+ and L— a resistor R30 and a capacitor KC2. The resistor and capacitor are part of a timing circuit which includes a tube PDTU similar to the tube TH previously discussed. The anode of the tube PDTU is connected through the relay PDT and the make contacts PD2 to the positive bus L+. The cathode of the tube is connected to the negative bus L—. By inspection of Fig. 5, it will be noted that the capacitor KC2 is connected across the control or grid electrode and the cathode of the tube PDTU. When the tube fires to energize the relay PDT, make contacts PDT1 close to establish with the make contacts PD2 a holding circuit for the relay PDT.

A discharge circuit for the capacitor KC2 is established by means of a discharge resistor R29 which may be connected across the capacitor through break contacts PD3 of the down-peak relay. In addition, the resistor may be connected across the capacitor through any one of four parallel arms, each including a load switch for a separate one of the elevator cars and make contacts of the down-preference relay for the associated elevator car. Thus, for the elevator car A the arm includes a load switch PL4 which is closed only when the elevator car is fully loaded. The arm also includes the make contacts X7 of the down-preference relay for the elevator car A. Similar contacts for the remaining elevator cars are associated in appropriate arms as clearly shown in Fig. 5.

When the elevator cars are placed on down-peak service, the break contacts PD3 open to interrupt the discharge circuit for the capacitor KC2. In addition, make contacts PD2 close to initiate the charging of the capacitor through the resistor R30.

As the capacitor charges, the positive bias on the control or grid electrode of the tube PDTU increases until at the expiration of a predetermined time the bias becomes sufficient to initiate a discharge in the tube and the relay PDT consequently is energized. As a result of its energization, the relay PDT closes its make contacts PDT1 to establish with the contacts PD2 a self-holding circuit. In addition, break contacts PDT2 open to deenergize the down-peak relay PD.

As a result of its deenergization, the down-peak relay opens its make contacts PD1 without immediate effect on the system operation. Make contacts PD2 open to deenergize the time relay PDT and this relay in turn opens its make contacts PDT1 and closes its break contacts PDT2 without immediate effect on the operation of the system. The down-peak relay also closes its break contacts PD3 to establish with the resistor R29 a discharge path for the capacitor KC2 and the capacitor now discharges preparatory to further operation.

Let it be assumed next that while the elevator system is on down-peak operation the elevator car A is set for down travel (make contacts X7 are closed) and the elevator car A is fully loaded (switch PL4 is closed). A discharge circuit for the capacitor KC2 now is completed through the resistor R29, the switch PL4 and the make contacts X7. Consequently, the capacitor is discharged and the voltage thereacross is unable to build up for the purpose of initiating a discharge in the tube PDTU. For this reason, as long as an elevator car set for down travel is fully loaded, the capacitor KC2 is unable to charge and the relay PDT remains deenergized to maintain the system on down-peak operation. After the elevator car A reaches the lower terminal floor and is set for up travel, (make contacts X7 are open) or after the elevator car A has discharged sufficient passengers to permit reopening of the load switch contacts PL4, the capacitor KC2 is permitted to charge and at the end of the timing interval determined by the charging on the capacitor, the relay PDT is energized to terminate the down-peak operation of the system.

The down-peak relay PD may be employed in any suitable manner for expediting elevator service in the down direction. In the present embodiment, the down-peak relay opens its break contacts PD4 (Fig. 3) and PD5. If the switches 89 and B89 are open, it follows that during down-peak operation the floor call stopping relay K cannot be energized while the elevator car A is set for travel in the up direction. By eliminating the response to registered up floor calls, the elevator service in the down direction is expedited.

Returning to Fig. 5, it will be assumed next that the manually operated switch 94 is open. This introduces additional requirements which must be met before the down-peak relay PD can be energized. The additional requirements are that none of the elevator cars while set for travel in the up direction can have been loaded at the lower terminal floor in excess of a predetermined load, which may, for example, be a load in excess of 30% rated capacity. Thus, if the elevator car A is set for up travel, the make contacts X10 of the down-preference relay are open. If the elevator car at the same time was loaded at the lower terminal floor at the start of its up trip in excess of 30% of its rated capacity, the break contacts LWL2 are open. Under these circumstances, the down-peak relay PD cannot be energized. Similar comments apply to the elevator cars B, C, and D. The corresponding contacts BX10, CX10, and DX10 and the corresponding contacts BLWL2, CLWL2, and DLWL2 for the elevator cars B, C and D are clearly shown in Fig. 5.

Figure 6:
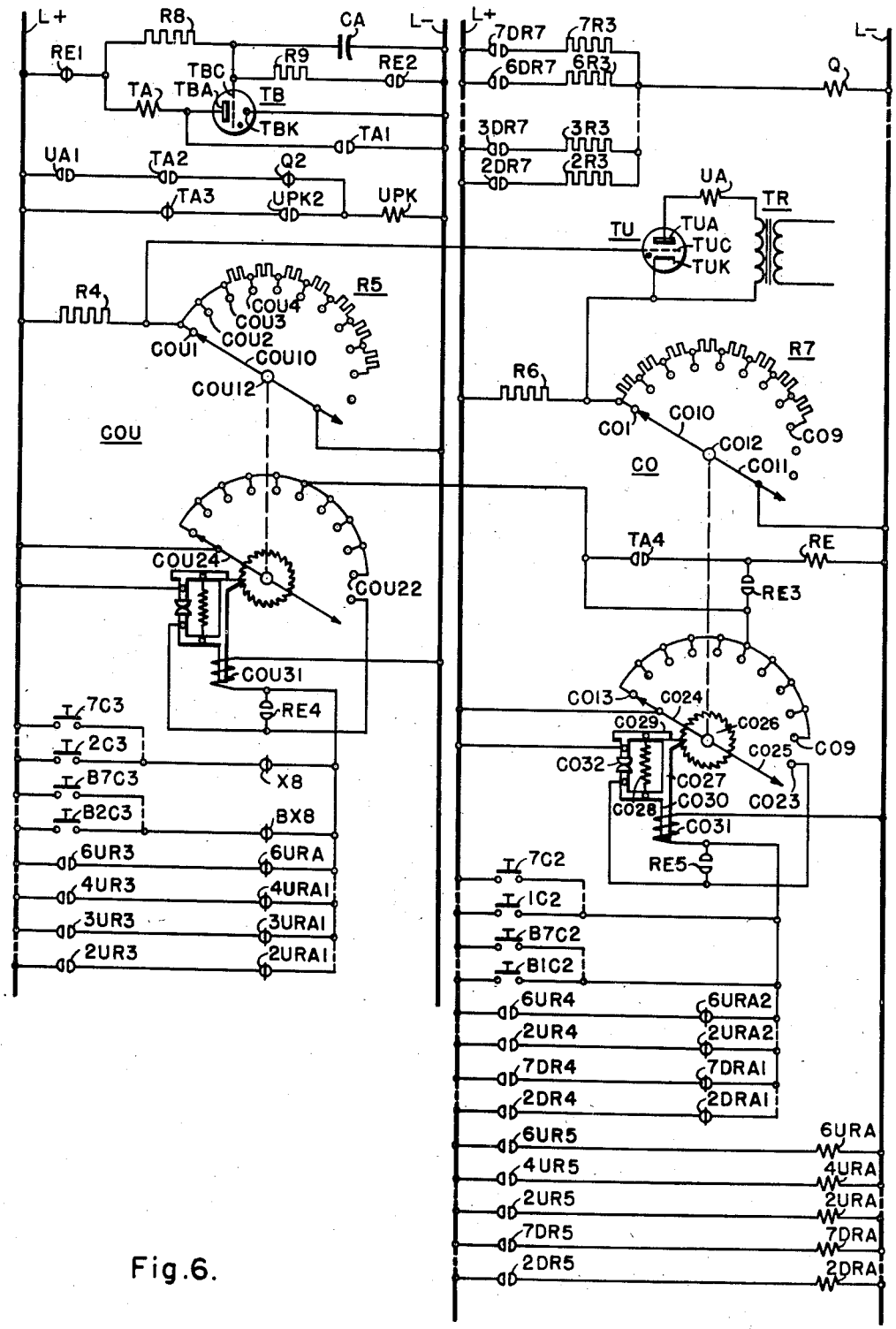

*Figure 6*

As shown in Fig. 6, the quota relay Q is connected for energization between buses L+ and L— through a parallel circuit having a separate arm for each of the floors above the lower terminal floor which is served by the elevator cars. In the present case, six arms are employed. Each of the arms includes make contacts of a separate one of the down-floor call storing relays and a resistor. For example, the arm corresponding to the second floor includes the make contacts 2DR7 and a resistor 2R3. The resistors and relays are so related that the relay Q picks up only when energized through at least a predetermined number of the resistors. For present purposes, it will be assumed that the quota relay picks up only when energized through at least three of the arms of the parallel circuit.

The remainder of Fig. 6 is directed to circuits for measuring the ratio of registered calls requiring movement of the elevator cars in the up direction to all registered calls for controlling the up-peak relay UPK.

If the ratio of the number of calls requiring up travel of the elevator cars to the total number of calls exceeds a predetermined value, the call ratio relay UA is energized and picks up. It will be noted that the relay UA is connected in series with the secondary winding of a transformer TR across the cathode TUK and anode TUA electrodes of an electronic tube TU. The tube TU also has a control electrode TUC. The tube TU may be of the cold cathode type or of the high-vacuum hot-electrode type. However, for present purposes it will be assumed that the tube TU is a gaseous discharge tube of the hot cathode type commonly known as a thyratron. The primary winding of the transformer TR may be energized from any suitable alternating-current source of energy.

The anode current flowing through the tube TU is controlled from a bridge circuit which includes resistors R4, R5, R6 and R7. The resistors R4 and R6 are equal fixed resistors whereas the resistors R5 and R7 are adjustable resistors. The value of the resistance in the resistor R5 is dependent on the number of registered calls requiring up travel of the elevator cars. The value of the resistance in the resistor R7 is dependent on the total number of calls. It will be noted that the resistor R4 and the effective value of the resistor R5 are connected in series across the buses L+ and L—. The resistor R6 and the effective value of the resistor R7 also are connected across the buses L+ and L—. The control electrode TUC of the tube TU is connected to a point intermediate the resistors R4 and R5, whereas the cathode electrode TUK is connected to a point intermediate the resistors R6 and R7.

In order to explain the operation of the bridge circuit, let it be assumed that the tube TU fires when the control electrode TUC becomes positive relative to the cathode electrode TUK. It will be assumed further that at the start of a measuring period the effective values of the resistors R5 and R7 are equal, that each registered call increases the effective value of the resistor R7 by 10,000 ohms, and that each registered call requiring up travel of an elevator car increases the effective value of the resistor R5 by 20,000 ohms. The bus L+ is assumed to be a positive bus and the bus L— is assumed to be a negative bus.

If a call is registered requiring movement of an elevator car in the down direction, the value of the resistor R7 is increased by 10,000 ohms. Since this increases the negative bias on the control electrode TUC, the tube TU does not fire. If a call is registered requiring an elevator car to travel in the up direction, an additional 10,000 ohms is added to the effective value of the resistor R7 which now has a total effective value of 20,000 ohms. However, the call also increases the effective value of the resistor R5 by 20,000 ohms under the assumed conditions, and the bridge consequently is balanced. Since the control electrode TUC and the cathode electrode TUK are at the same potential relative to each other, the tube TU does not fire under the assumed conditions.

If another call is registered requiring movement of an elevator car in the up direction, the effective value of the resistor R7 becomes 30,000 ohms, whereas the effective value of the resistor R5 becomes 40,000 ohms. Consequently, under the assumed condition, the bridge is unbalanced and a positive bias is applied to the control electrode TUC which results in firing of the tube TU. The relay UA thereupon picks up. Under these assumed conditions, the tube fires when the ratio of registered calls requiring movement of the elevator cars in the up direction to the total registered calls exceeds one half.

If each registered call requiring movement of an elevator car in the up direction were to increase the effective resistance of the resistor R5 by 30,000 ohms, it follows that the tube TU would fire whenever the ratio of the registered calls requiring movement of the elevator cars in the up direction to the total registered calls exceeded one-third.

The adjustment of the resistor R7 in accordance with registered calls is controlled by a stepping switch CO which has a semi-circular row of contacts CO1 to CO9 connected to taps on the resistor R7. The contacts are engaged by one of two brushes CO10 and CO11, which are displaced from each other 180° about a shaft CO12. The brushes are connected to the bus L—.

The stepping switch also has a second semi-circular row or bank of contacts CO13 to CO23 which are engaged by one of two brushes CO24 and CO25, displaced from each other by 180° about the shaft CO12. The brushes CO24 and CO23 are connected to the bus L+. The contacts CO13 to CO22 are connected to the bus L— through a reset relay RE and either make contacts TA4 or make contacts RE3.

In order to step the shaft CO12, a ratchet wheel CO26 is secured thereto and a pawl CO27 is positioned to engage the ratchet wheel. This pawl is biased upwardly by means of a spring CO28 to a position wherein the pawl CO27 engages a stop CO29.

The pawl CO27 has a magnetic core CO30 associated with a solenoid CO31. The solenoid is connected for energization across the buses L+ and L— through a parallel circuit having a separate arm for each call which may be registered. For purposes of illustration, cars A and B have been illustrated.

An arm is provided for each car call which may be registered. For the elevator car A, two arms are illustrated for the first and seventh floors. One of the arms contains the contacts 1c2, and the other arm contains the contacts 7c2. A similar arm (not shown) is provided for each intermediate floor, and corresponding arms are provided for each of the elevator cars. One of these arms is momentarily closed for each car call which is registered.

An arm is also provided for each floor call which may be registered. Thus, one arm for the sixth floor contains make contacts 6UR4 of the up floor-call storing relay 6UR and break contacts 6URA2 which open shortly after the make contacts 6UR4 close to provide a momentary circuit closure. A similar arm is provided for each call storing relay, but arms are shown only for relays 6UR, 2UR, 7DR and 2DR.

Each floor-call storing relay 2UR to 6UR and 2DR to 7DR has make contacts controlling the energization of an auxiliary relay, respectively, 2URA to 6URA and 2DRA to 7DRA. For example, the relay 2UR has make contacts 6UR5 controlling energization of the relay 6URA. Energizing circuits are illustrated only for the relays 2DRA, 7DRA, 2URA, 4URA and 6URA.

Consequently, for each registered call, a pulse of current is supplied to the solenoid CO31 to attract the associated magnetic core CO30 against the bias of the spring CO28. Upon completion of the pulse, the spring CO28 urges the pawl CO27 against the stop CO29. During such movement, the pawl advances the shaft CO12 one step. Each step of the shaft CO12 corresponds to the angular distance between successive contacts CO1 to CO9 and CO13 to CO23.

For resetting purposes, the solenoid CO31 is connected across the buses L+ and L— through make contacts RE5 of the reset relay and self-stepping contacts CO32 of the stepping switch. By inspection of Fig. 6, it will be observed that the contacts CO32 are biased to their closed conditions by the spring CO28 and are opened when the pawl CO27 is moved down by the solenoid CO31. Consequently, as long as the contacts RE5 remain closed, the stepping switch steps rapidly in a clockwise direction as viewed in Fig. 6. Such stepping switches are well known in the art. It will be noted that the contact CO23 is connected to the bus L+ through the self-stepping contacts CO32.

The stepping switch COU associated with the resistor R5 is identical to the stepping switch CO with the exception that the parallel arms controlling stepping of the switch CO respond only to calls requiring up movement of the cars to make the stepping switch COU respond only to registered calls requiring travel of the elevator cars in the up direction. Components of the stepping switch COU which are similar to those of the stepping switch CO are identified by similar reference characters except that the prefix COU rather than CO is employed.

As clearly shown in Fig. 6, the solenoid COU31 is connected across the buses L+ and L— through a parallel circuit having a separate arm for each registerable call requiring up travel of the elevator cars. Thus, for the elevator car A the solenoid COU31 is connected across the buses L+, L— through a circuit including the break contacts X8 of the down-preference relay and a plurality of parallel arms each including one of the sets of contacts 2c3 to 7c3. Thus, the solenoid COU31 receives a pulse for each operation of a car call push button only if the car is set for up travel (contacts X8 are closed). Arms are shown only for the contacts 2c3 and 7c3.

A similar circuit is shown for the elevator car B and one is provided for each elevator car of the bank.

The solenoid COU31 may also be energized through an additional arm provided for each of the up floor-call storing relays in a manner analogous to that discussed for the solenoid CO31. Thus, energizing arms are provided for the contacts 6UR3, 4UR3, 3UR3 and 2UR3 associated with contacts 6URA1, 4URA1, 3URA1 and 2URA1, respectively, (the arm for the fifth floor is not shown). Arms for down floor-call storing relays are not provided for the switch COU.

It will be noted that the contacts COU1, COU2 and COU3 are connected directly to each other and have no resistance therebetween. This is for the purpose of preventing operation of the relay UA unless at least three calls have been registered requiring movement of elevator cars in the up direction. The number of such calls required before the relay UA is permitted to operate may be controlled by the number of contacts which are connected directly to each other. If desired, the first resistance step (that between the contacts COU3 and COU4) may be made slightly larger than the remaining resistance steps to assure the desired operation.

The stepping switches are reset at predetermined intervals. Such intervals are measured by an electronic tube TB which has its anode electrode TBA and its cathode electrode TBK connected across the buses L+ and L— through a timing relay TA and break contacts RE1 of the reset relay. The break contacts RE1 also are connected in series with a resistor R8 and a capacitor CA across the buses L+ and L—. The tube TB has a control electrode TBC which is connected to a point between the resistor R8 and the capacitor CA. A resistor R9 is connected through make contacts RE2 across the capacitor CA. The tube TB may be of any desired type such as a hot cathode, high vacuum tube or a thyratron. For present purposes, it will be assumed that the tube is a cold cathode gaseous discharge tube.

When the break contacts RE1 close, the capacitor CA starts to charge. After the lapse of a predetermined interval, the charge across the capacitor CA becomes sufficient to initiate a discharge in the tube TB. When the tube fires, the resultant anode current results in pickup of the timing relay TA, and this relay closes its make contacts TA1 to establish with the break contacts RE1 a self-holding circuit. When the reset relay RE picks up, it opens its break contacts RE1 to deenergize the timing relay TA and closes its make contacts RE2 to establish a discharge circuit for the capacitor CA.

Closure of the make contacts TA2 of the timing relay prepares the up-peak relay UPK for energization. Such energization can be effected only if the break contacts Q2 are closed to indicate that the down floor calls registered in the system are below a predetermined number. In addition, make contacts UA1 of the call ratio relay must be closed to indicate that the ratio of the calls requiring up travel to the total calls is above a predetermined value. When the up-peak relay picks up, it closes its make contacts UPK3 to complete with the break contacts TA3 a holding circuit for the up-peak relay. The break contacts TA3 are designed to close as the relay TA drops out slightly before the make contacts TA2 open.

It is believed desirable at this point to describe a cycle of operations of the circuits shown in Fig. 6. Let it be assumed that the components are in the conditions illustrated in Fig. 6, and that the break contacts RE1 have just reclosed to start the charging of the capacitor CA. It will be assumed further that the resistors R5 and R7 are proportioned to pick up the relay UA when the ratio of calls requiring up travel to total calls is three-fourths or more.

As the capacitor CA charges, it will be assumed that the elevator car A starts a down trip and that a down floor call is registered at the second floor. Also, the elevator car B starts an up trip and up floor calls are registered at the second, fourth and sixth floors.

As the down floor call is registered at the second floor, the make contacts 2DR4 close to complete with the break contacts 2DRA1 an energizing circuit for the solenoid CO31. Also, the contacts 2DR5 close to energize the auxiliary relay 2DRA. The auxiliary relay opens its contacts 2DRA1 to restrict the energization of the solenoid CO31 to a brief pulse. In response to such energization the solenoid attracts the magnetic core CO31 against the bias of the spring CO28. Since the solenoid CO31 immediately is deenergized, the spring CO28 moves the pawl CO27 upwardly to advance the shaft CO12 and the associated brushes through one step and the brushes respectively engage the contacts CO2 and CO14. During the stepping operation, the self-stepping contacts CO32 open and reclose without affecting the operation of the system.

It will be assumed that the advance of the brush CO10 increases the effective value of the resistor R7 to 10,000 ohms. This places a negative bias on the tube TU and the stop ratio relay UA consequently remains dropped out.

In an analogous manner, the three registered up floor calls at the second, fourth and sixth floors supply three successive pulses of energy to the solenoid CO31 for the purpose of advancing the stepping switch CO three additional steps. Thus, closure of make contacts 2UR4, 4UR4 (not shown) and 6UR4 of the up floor-call storing relay complete energizing circuits for the solenoid CO31. Closure of contacts 2UR5, 4UR5 and 6UR5, respectively, energize the relays 2URA, 4URA and 6URA. These relays open their contacts 2URA2, 4URA2 (not shown) and 6URA2 to interrupt the energizing circuits established by the contacts 2UR4, 4UR4 and 6UR4, and thus three pulses are provided for the solenoid. The probability that two pulses may occur simultaneously is remote and may be disregarded.

The brush CO10 now engages the contact CO5, and it will be assumed that each step introduces 10,000 ohms of the resistor R7 to give a total effective value of 40,000 ohms.

The registered down floor call does not affect the solenoid COU31. However, the three registered up floor calls result in closures of make contacts 2UR3, 4UR3 and 6UR3 and subsequent openings of the contacts 2URA1, 4URA1 and 6URA1 by a sequence which will be clear from the discussion of the foregoing energizations of the solenoid CO31 to supply three successive pulses of current to the solenoid COU31. This advances the shaft COU12 three steps to bring the brush COU10 into engagement with the contact segment COU4.

It will be assumed that the amount of resistance between the contacts COU3 and COU4 is 41,000 ohms. Since the effective value of the resistor R5 is 41,000 ohms as compared to an effective value of 40,000 ohms for the resistor R7, the bridge is unbalanced in a direction supplying a positive pulse to the control electrode of the tube TU and this tube consequently discharges to pick up the relay UA. The relay UA is preferably a somewhat sluggish relay to prevent response to the relay to brief stepping operations of the stepping switches.

It will be assumed next that at this stage the capacitor CA has charged to a value sufficient to fire the tube TB and pick up the relay TA. The relay TA closes its make contacts TA1 to establish with the break contacts RE1 a self-holding circuit. In addition, make contacts TA2 close. Since less than three down floor calls are assumed to be registered, the break contacts Q2 also are closed and since the make contacts UA1 are closed, the up-peak relay UPK is energized. This relay closes its make contacts UPK3. However, since the break contacts TA3 are open, a self-holding circuit for the up-peak relay is not yet established.

The timing relay TA also closes its make contacts TA4 to establish with the stepping switches an energizing circuit for the reset relay RE. The reset relay opens its break contacts RE1 to deenergize the timing relay TA. In addition, make contacts RE2 close to establish with the resistor R9 a discharge circuit for the capacitor CA. Closure of make contacts RE3 establishes with the stepping switches a self-holding circuit for the resetting relay. Closure of the make contacts RE5 completes with the self-stepping contacts CO32 a self-stepping circuit for the solenoid CO31. Consequently, the relay CO rapidly steps in a clockwise direction until the brush CO24 engages the contact CO23 to maintain energization of the solenoid CO31. As the brush CO24 leaves the contact segment CO22, it is no longer effective for completing a self-holding circuit for the relay RE. In a similar manner, closure of the make contacts RE4 establishes a self-stepping circuit for the stepping switch COU and this resets until the brush COU24 leaves the contact COU22. Since the arms CO24 and COU24 have passed respectively the contacts CO22 and COU22, the reset relay RE is now deenergized. The make contact RE5 opens to deenergize the solenoid CO31 and this permits the spring CO28 to advance the shaft CO12 one step to bring the brush CO23 into engagement with the contact segment CO13. In a similar manner the opening of the make contacts RE4 advances the shaft COU12 one step.

It will be recalled that the opening of the break contacts RE1 resulted in dropout of the timing relay TA. This relay closed its break contacts TA3 in advance of opening of the make contacts TA2 in order to establish with the contacts UPK3 a self-holding circuit for the up-peak relay UPK. Opening of the make contacts TA4 had no immediate effect on the operation of the system.

Returning to the effect of the dropout of the reset relay RE, this relay opens its make contacts RE2 to interrupt the discharge circuit for the capacitor CA and closes its break contacts RE1 to start another timing operation.

In the foregoing discussion it is clear that the circuits of Fig. 6 measure a ratio of up floor calls to total calls for each interval determined by the timing relay TA, and if the ratio for any interval exceeds a predetermined value and if the down floor calls at the same time are below a predetermined value, the up-peak relay UPK is energized.

The up-peak relay UPK may be employed for expediting elevator service in the up direction in any desired manner. For present purposes it will be assumed that this relay opens break contacts UPK1 (Fig. 3) and UPK2. Consequently, if the switches 90 and B90 are open, the floor call stopping relays K and BK cannot be energized while the elevator cars A and B, respectively, are set for travel in the down direction. By eliminating such response of the elevator cars to down floor calls, elevator service in the up direction is expedited.

Figure 7

In the discussion of Figs. 3 and 6, it was pointed out that each operation of a car call push button was accompanied by momentary closure of contacts. A car call push button operating in this manner is illustrated in Fig. 7, which will be assumed to represent the car call push button 6c.

The car call push button for the sixth floor has a pair of contacts 6c mounted on a bridging member 100 which has secured thereto a magnetic armature 102. The magnetic armature extends through an opening in a sheet of non-magnetic insulating material 104 which may be constructed of a phenolic resin. A pair of contacts 6cA are mounted on the material 104 for engagement by the contact 6c when the bridging member 100 is moved toward the material 104. The bridging member 100 is biased upwardly as viewed in Fig. 7 by means of a spring 106. The attractive force of the coil 6cc is insufficient to move the armature 102 from the position illustrated in Fig. 7. However, when the armature 102 is manually moved downwards, the attractive force exerted by the coil 6cc is sufficient to hold the armature in operated position.

If back contacts for the push button are desired, bridging contacts 6c1 may be mounted on the bridging member 100. The spring 106 biases the contacts 6c1 into engagement with fixed contact 6c1A.

The push button also includes an operating cylinder 110 which extends through an opening in the panel 112. A spring 114 is interposed between the bridging member 100 and the cylinder 114 for the purpose of biasing the cylinder upwardly, as viewed in Fig. 7, to maintain a stop pin 116 in engagement with the panel 112.

Conveniently, the cylinder 110 may be molded from a material such as a phenolic resin and it has a cam 118 projecting therefrom for the purpose of engaging a cam follower 120. The cam follower 120 is hingedly mounted on one end of a lever 122 by a hinge 120A which permits rotation of the cam follower only in a clockwise direction as viewed in Fig. 7. The lever 122 is pivotally mounted by means of a pin 124 on a fixed part of the structure. The lever 122 is biased towards a rest position by means of two springs 126 and 128 which extend between the lever and fixed supports. The lever may be constructed of an insulating material and carries two movable contacts 6c2 and 6c3 which are movable into engagement with fixed contacts 6c2A and 6c3A, respectively.

By inspection of Fig. 7, it will be noted that when the cylinder 110 is operated the spring 106 yields to permit engagement of the contacts 6c with the fixed contacts 6cA. The continuing movement of the cylinder results in compression of the spring 114 to permit movement of the cam 118 against and past the cam follower 120. As a result of such movement, the contacts 6c2 and 6c3 are forced into engagement, respectively, with the associated contacts 6c2A and 6c3A. After the cam 118 passes the cam follower 120, the springs 126 and 128 return the lever to the position illustrated in Fig. 7. When the cylinder 110 is released, the spring 114 returns it to the position illustrated in Fig. 7. However, the force applied by the cam to the cam follower 120 during the return movement rotates the cam follower about the axis of the hinge 120A without moving the lever 122. A light spring 120B biases the cam follower in a counterclockwise direction about the axis of the hinge 120A to assure return of the cam follower to the position illustrated in Fig. 7. The spring 120B exerts a force which is too small to actuate the lever 122 to any appreciable extent against the force of spring 126.

It will be understood that when the push button is operated, the coil 6cc retains the armature 102 in its lowest position as viewed in Fig. 7. When the coil subsequently is deenergized, the spring 106 returns the bridging member 100 and its associated armature 102 to the positions illustrated in Fig. 7.

Figure 8

In connection with Figs. 4 and 5, reference was made to circuits for controlling the motor relay MG. Modified circuits for this purpose are illustrated in Fig. 8.

As shown in Fig. 8, an off-hours relay OH is connected for energization across the buses L+ and L— through break contacts OP1, PD6 and UPK4. The break contacts OP1 are opened when the elevator car is assigned to off-peak service. The break contacts PB6 are open when the elevator car is assigned to provide down-peak service. The break contacts UPK4 are open when the elevator cars are assigned to provide up-peak service. When the three sets of contacts are closed, the relay OH is energized to indicate that the elevator system is conditioned for off-hours or intermittent service.

If the various periods occur at substantially predetermined times during the day, the contacts OP1, PD6 and UPK4 may be operated by a time switch when the elevator system is assigned, respectively, to provide off-peak, down-peak and up-peak service. For present purposes, it will be assumed that the contacts PD6 are operated by the relay PD of Fig. 5 whereas the contacts UPK4 are operated by the relay UPK of Fig. 6.

A motor initiating relay ETRA is energized in response to energization of any of the auxiliary starting relays S, BS, SC and DS. To this end, make contacts S5, BS5, CS5 and DS5 of these relays are connected in parallel for the purpose of controlling the energization of the relay ETRA. Break contacts ETRA1 of the motor initiating relay ETRA and make contacts OH1 of the off-hours relay OH are connected in series with a motor intermediate relay ETRM. A manually operated switch 121 also may be connected in this circuit.

The motor timing relay ETR is associated with a tube KU for the purpose of measuring a time interval. The tube KU may be similar to the tube TH of Fig. 5. The anode of the tube KU is connected to the positive bus L+ through the relay ETR, a manually operable switch 123 and make contacts ETRM1 of the motor intermediate relay. The cathode of the tube is connected to the negative bus L—. A capacitor KC3 is connected across the grid or control electrode and cathode of the tube KU. This capacitor is connected in a charging circuit in series with the resistors R35 and R36 across the buses L+ and L—. A discharge circuit for the capacitor may be established through the resistor R36 by closure either of the make contacts ETR1 or of the break contacts ETRM2. When the motor timing relay ETR picks up, it closes make contacts ETR1 to complete with the resistor R37 and the make contacts ETRM1 a self-holding circuit.

Closure of the make contacts ETR3 connects a motor master relay 139M across the buses for energization.

When the motor master relay 139M picks up, it closes make contacts associated with each of the elevator cars. Thus, for the elevator car A, closure of make contacts 139M1 completes an energizing circuit for the motor relay MGA provided that the elevator system is on off-hours operation (make contacts OH2 are closed), and further provided that the elevator car A is at the lower terminal or dispatching floor (switch 1FL is closed only at the lower terminal floor). The circuit also may include a switch 125 which is closed only when the elevator car A is in service and preferably includes break contacts 70T5 which close only after the elevator car has stopped at the floor for a substantial time.

It will be noted that the make contacts 139M1 are shunted by a circuit which includes break contacts S6 of the auxiliary starting relay for the lower terminal floor, make contacts MGA1 of the auxiliary motor relay MGA and break contacts TS6. The break contacts TS6 are associated with the upper terminal floor and are operated by an auxiliary starting relay for the upper terminal floor which is similar to the auxiliary starting relay S for the lower terminal floor. The contacts TS6 open when a starting operation of the elevator car at the upper terminal floor is initiated. For present purposes, it will be assumed that the contacts TS6 are shunted by a switch 125A.

When the relay MGA drops out, it closes break contacts MGA2 to complete an energizing circuit for the motor relay MG. This relay is employed in the modification of Fig. 8 for operating the make contacts MG1, MG2 and MG3 of Fig. 2. Consequently, when the auxiliary motor relay MGA drops out, the motor relay MG is picked up to start the motor generator set in operation.

The operation of the modification of Fig. 8 now will be considered. Let it be assumed that the elevator system is on off-hours operation and that the relay OH consequently is picked up. This means that the make contacts OH1 are closed. It is assumed also that the elevator cars are parked at the lower terminal floor. The elevator car A is assumed to be the next car to leave the dispatching floor. Since no car has the start signal, relay ETRA is deenergized and the break contacts ETRA1 are closed, the motor intermediate relay ETRM is picked up and its make contacts ETRM1 are closed. Also, the break contacts ETRM2 are open.

When the break contacts ETRM2 opened initially, the discharge circuit for the capacitor KC3 was interrupted and the capacitor consequently charged through its resistors R35 and R36. Upon completion of the time delay required to charge the capacitor KC3 to the breakdown point for the tube KU, the tube KU discharges to energize the motor timing relay ETR. This relay closes its make contacts ETR1 to complete with the break contacts ETRM1 a self-holding circuit. In addition, make contacts ETR2 close to complete a discharge circuit for the capacitor KC3.

Inasmuch as the relay ETR is now energized, the make contacts ETR3 are closed and motor relay 139M is energized. For this reason, the make contacts 139M1 and similar contacts for the other elevator cars are closed. It will be recalled further that in view of the energization of the off-hours relay OH, the make contacts OH2 are closed and the auxiliary motor relay MGA is energized. This circuit is completed even though the break contacts N4 are open. Contacts N4 are open for the reason that the elevator car A is selected as the next car to leave the dispatching floor. It is assumed that the car has remained at the dispatching floor for a time sufficient to permit dropout of the relay 70T and contacts 70T5 are closed.

Since the auxiliary motor relay MGA is energized, the make contacts MGA1 are closed to complete with the contacts S6 and the switch 125A a shunt circuit around the make contacts 139M1. In addition, break contacts MGA2 are open to prevent energization of the motor relay MG. This means that the motor generator set of the elevator car A is shut down, and the motor generator sets of the other elevator cars are similarly shut down.

At this stage, it will be assumed that a call for elevator service is registered and that the auxiliary starting relay S is energized by the sequence previously discussed. The energized auxiliary starting relay opens its break contacts S6 without immediate effect on the operation of the system. However, closure of make contacts S5 results in energization of the motor initiating relay ETRA. The relay ETRA opens its break contacts to deenergize the motor intermediate relay ETRM.

The resultant opening of the make contacts ETRM1 deenergizes the motor timing relay ETR and the accompanying closure of the break contacts ETRM2 establishes a second discharge circuit for the capacitor KC3.

The motor timing relay ETR opens its make contacts ETR1 and ETR2 without immediate effect on the operation of the system. However, opening of the make contacts ETR3 results in deenergization of the motor master relay 139M, and this relay opens its make contacts 139M1 to deenergize the auxiliary motor relay MGA (it will be recalled that the break contacts S6 also are open at this time).

The auxiliary motor relay MGA opens its make contacts MGA1 without immediate effect on the operation of the system. However, closure of the break contacts MGA2 energizes the motor relay MG. The relay MG closes its make contacts MG1, MG2 and MG3 (Fig. 2) for the purpose of starting the motor generator set of the elevator car A.

The elevator car A now starts from the first floor by the sequence previously discussed. As a result of the departure, the auxiliary starting relay S is deenergized. The deenergized auxiliary starting relay closes its break contacts S6 without immediate effect on the operation of the system. However, the opening of the make contacts S5 deenergizes the motor initiating relay ETRA. This, in turn, completes with the make contacts OH1 an energizing circuit for the motor intermediate relay ETRM. The motor intermediate relay closes its make contacts ETRM1 and opens its break contacts ETRM2. As a result of the opening of break contacts ETRM2, no discharge circuit remains for the capacitor KC3 and this capacitor consequently charges at a rate determined by its capacitance and by the resistance of its associated resistors.

As an incident to the starting of the elevator car A, a second elevator car is selected as the next car to leave the lower dispatching floor and this will be assumed to be the elevator car B. Consequently, the break contacts BN4 for the elevator car B are open, but such opening has no effect at this time on the operation of the system.

If a starting operation of the elevator car B is initiated prior to the breakdown of the tube KU, the make contacts BS5 close to reenergize the motor initiating relay ETRA. This relay then opens its break contacts ETRA1 to deenergize the motor intermediate relay ETRM. The resultant closure of the break contacts ETRM2 reestablishes the discharge circuit for the capacitor KC3. Also, the make contacts ETRM1 open and the relay ETR can not be energized under these conditions. The elevator car B now starts by a sequence which will be understood from the discussion of the starting of the elevator car A. As the elevator car B leaves the lower dispatching floor, the make contacts BS5 open to deenergize the motor initiating relay ETRA. This relay, in turn, closes its break contacts ETRA1 to reenergize the motor intermediate relay ETRM. The resultant closure of the make contacts ETRM1 and opening of the break contacts of the relay ETR. It will be assumed that while the relay ETR is measuring its time interval, the elevator cars A and B complete their assignments and return to the lower parking floor and that no other assignment to start is received by any of the elevator cars.

When the voltage across the capacitor KC3 reaches a value sufficient to initiate a discharge in the tube KU, the motor timing relay ETR picks up and closes its make contacts ETR1 to establish with the make contacts ETRM1 a self-holding circuit. In addition, make contacts ETR2 close to establish a discharge circuit for the capacitor KC3.

Closure of the make contacts ETR3 energizes the motor master relay 139M which closes its make contacts 139M1 and 139M2. Since the make contacts OH2 and OH3 are both closed, it follows that auxiliary motor relays MGA and BMGA are both energized. It will be understood that since the elevator cars are at the lower terminal floor, the switches 1FL and B1FL are closed.

The energized auxiliary motor relays close their contacts MGA1 and BMGA1 without immediate effect on the operation of the system. However, the accompanying openings of the contacts MGA2 and BMGA2 deenergize the motor relays MG and BMG. These relays shut down the motor generator sets for the elevator cars A and B.

In this way, during off-hours operation the motor generator set of each of the elevator cars selected as the next car to leave the dispatching floor is started in response to pick-up of the associated auxiliary starting relay. As long as at least one elevator car continues to be started within the timing interval of the relay ETR, each of the motor generator sets started in operation remains operating. However, if none of the elevator cars is assigned to start within the time interval measured by the relay ETR, each motor generator set in operation is shut down.

The operation of the embodiment of Fig. 8 when the system is not assigned to off-hours operation now will be considered. To this end, it will be assumed that one of the sets of contacts OP1, DP6 and UPK4 opens to indicate that a substantial demand for elevator service is registered or expected. The off-hours relay OH opens its make contacts OH1 to deenergize the motor initiating relay ETRM. This relay opens its make contacts ETRM1 and closes its break contacts ETRM2. Inasmuch as the relay ETR is now deenergized, its make contacts ETR1 and ETR2 open without immediate effect on the operation of the system. The opening of the make contacts ETR3 deenergizes the motor master relay 139M. This relay opens its make contacts 139M1.

It will be assumed at this stage that the elevator car A is selected as the next car to leave the lower terminal floor. Consequently, the break contacts N4 of the loading relay for the elevator car A are open. In addition, the make contacts OH2 are open and the auxiliary motor relay MGA consequently is deenergized. The relay MGA closes its break contacts to energize the motor relay MG for the purpose of starting the motor generator set of the car A.

Turning now to the elevator car B, it should be noted that the opening of the contacts 139M2 and OH3 leaves the auxiliary motor relay BMGA energized through the circuit

L+, BS6, BTS6, BMGA1, BN4, BMGA, B1FL, B70T5, B125, L—

It will be assumed that at this stage a starting operation of the elevator car A is initiated and that the elevator car B is selected as the next elevator car to leave the lower dispatching floor. As a result of such selection, the break contacts BN4 of the load relay for the elevator car B open. Since the make contacts OH3 are open, it follows that auxiliary motor relay BMGA now is deenergized and the break contacts BMGA2 close to energize the motor relay BMG. The relay BMG consequently initiates starting of the motor generator set for the elevator car B.

It should be noted that the energization of the auxiliary motor relays MGA and BMGA results in opening of make contacts MGA1 and BMGA1. Inasmuch as the make contacts 139M1 and 139M2 are also open, it follows that the relays MGA and BMGA can not be reenergized to shut down the motor generator sets of the elevator cars A and B until the system returns to off-hours operation.

From the foregoing analysis, it may be seen that when the elevator system is not on off-hours operation the motor generator set for each of the elevator cars initially is started when the associated elevator car is selected as the next car to leave the dispatching floor. When the motor generator sets are once placed in operation, they remain in operation until the system returns to off-hours operation. The sequence by which the motor generator sets are shut down during off-hours operation previously has been described.

If desired, additional contacts may be placed in parallel with the contacts S5 to control the initiation of a timing operation. Thus, assume that the manually-operated switch 127 is closed to connect in parallel with the contacts S5 the additional make contacts 70T6, B70T6, C70T6, D70T6, 80–2, B80–2, C80–2 and D80–2. Under these circumstances, during off-hours operation the relay ETR, if deenergized, can be energized only if none of the contacts associated with the relay ETRA has been closed within a timing interval of the relay ETR.

Although the invention has been described with reference to certain specific embodiments thereof, numerous modifications falling within the spirit and scope of the invention are possible. For this reason, the specific embodiments illustrated and described above are to be construed in an illustrative rather than in a limiting sense.

We claim as our invention:

1. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, first sequence means for establishing a first pattern for transferring the sources between operating and non-operating conditions, second sequence means for establishing a second pattern for transferring the sources between operating and non-operating conditions, and transfer means responsive to a predetermined condition occurring automatically while the system is prepared to carry passengers for transferring the system from control by the first sequence means to control by the second sequence means.

2. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, dispatching means for selecting one elevator car at a time present at the terminal landing as the next elevator car to be dispatched and for initiating starting of the selected elevator car to answer a predetermined demand registered by the registering means, first sequence means for establishing a first pattern for transferring the sources between operating and non-operating conditions, second sequence means for establishing a second pattern for transferring the sources between operating and non-operating conditions, and transfer means responsive to a predetermined condition occurring automatically while the system is prepared to carry passengers for transferring the system from control by the first sequence means to control by the second sequence means, said first pattern operating to transfer the source of the selected elevator car from non-operating to operating condition while a predetermined demand is registered by the registering means, and for transferring an operating source of a non-selected elevator car to non-operating condition in response to the lapse of a substantial time during which the last-named elevator car remains at a parking station, and said second pattern operating to maintain an operating source of an elevator car in operating condition during a period in which a predetermined demand for elevator service is normally encountered despite the lapse of said substantial time during which the last-named elevator car remains at a parking station.

3. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, means establishing a first mode of operation of the elevator system, means responsive to a predetermined traffic condition for transferring the system to a second mode of operation, first sequence means for establishing a first pattern for transferring the sources between operating and non-operating conditions, second sequence means for establishing a second pattern for transferring the sources between operating and non-operating conditions, and transfer means responsive to the transfer of the system from the first to the second mode of operation for transferring the system from control by the first sequence means to control by the second sequence means.

4. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, first sequence means for establishing first conditions under which the source of energy for each of the elevator cars is placed in operating condition and thereafter returned to non-operating condition, second sequence means for establishing second conditions under which the source of energy for each of the elevator cars is placed in operating condition, is retained in operating condition despite presence of said first conditions and is thereafter returned to non-operating condition, and transfer means responsive to a predetermined condition occurring automatically while the system is prepared to carry passengers for transferring the system from control by the first sequence means to control by the second sequence means.

5. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, dispatching means for selecting one elevator car at a time present at the terminal landing as the next elevator car to be dispatched and for initiating starting of the selected elevator car to answer a predetermined demand registered by the registering means, first selecting means establishing a first mode of operation for intermittent service wherein the source of energy of each of the selected elevator cars is placed in operating condition in response to a predetermined demand for service and wherein each operating source of energy is placed in non-operating condition in response to decrease of the demand below a predetermined value, second selecting means establishing a second mode of operation for substantially continuous service wherein the sources of energy are maintained in operating condition for the duration of the second mode of operation despite temporary decrease in demand for service below said predetermined value, and transfer means responsive to a predetermined condition occurring automatically while the elevator system is prepared to carry passengers for transferring the system from control by the first selecting means to control by the second selecting means.

6. In an elevator system, a structure having a plurality of landings, an elevator car, means mounting the elevator car for movement relative to the structure to serve the landings, motive means for moving the elevator car relative to the structure, and control means for controlling the starting and stopping of the elevator car, said control means comprising means selectively operable for establishing first and second modes of operation of the elevator car, and selecting means responsive to a function of the call demand for elevator service for transferring the system from one to the other of said modes, said selecting means comprising a computing device having a first control dependent on the call demand for elevator service and a second control dependent on the call demand for elevator service in a predetermined direction, and translating means responsive to a predetermined relation between said demands.

7. In an elevator system, a structure having a plurality of landings, an elevator car, means mounting the elevator car for movement relative to the structure to serve the landings, motive means for moving the elevator car relative to the structure, and control means for controlling the starting and stopping of the elevator car, said control means comprising call means for each of the landings for registering first calls effective for stopping the elevator car as the elevator car approaches in a first direction each landing for which a first call is registered, said call means including means for registering second calls effective for stopping the elevator car as the elevator car approaches in a second direction each landing for which a second call is registered, means selectively operable for establishing first and second modes of operation of the elevator car, and selecting means responsive to a function of the combined first calls and second calls for transferring the system from one to the other of said modes.

8. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, third call registering means for registering calls for landings at which the elevator car is to discharge load, means for stopping an elevator car at each landing approached by the elevator car for which a call is registered by the call registering means which may be served by such elevator car without change in direction of travel, means selectively operable for establishing first and second modes of operation of the elevator cars, and transfer means responsive to a predetermined relation between calls registered by the first call registering means and calls registered by all of the call registering means for transferring the system from the first mode to the second mode of operation.

9. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, third call registering means for registering calls for landings at which the elevator car is to discharge load, means for stopping an elevator car at each landing approached by the elevator car for which a call is registered by the call registering means which may be served by such elevator car without change in direction of travel, selective means selectively operable for establishing a first mode of operation wherein said elevator cars provide a preponderance of elevator service in the first direction, said selective means being operable for establishing a second mode of operation wherein said elevator cars provide substantially balanced service in the two directions, and transfer means responsive to a predetermined relation between calls registered by the first call registering means and calls registered by all of the call registering means for transferring the system from the first mode to the second mode of operation.

10. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, and transfer means responsive to a predetermined condition of the system for transferring the system from the first mode to the second mode, said condition of the system including a predetermined registration of calls by the call registering means and a predetermined bypassing operation of the elevator cars.

11. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, and transfer means responsive to a predetermined condition of the system for transferring the system from the first mode to the second mode, said condition of the system including a predetermined rate of bypassing of the elevator cars while set for travel in one direction.

12. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, and transfer means responsive to a predetermined condition of the system for transferring the system from the first mode to the second mode, said condition of the system including a predetermined call registration by the first call registering means for a first group of said landings, a predetermined call registration by the first call registering means for a second group of said landings, absence of a predetermined loading of an elevator car starting a trip in the second direction from a terminal landing, and a predetermined rate of bypassing of the elevator cars while set for travel in the first direction, said second mode of operation conditioning the elevator system to expedite service in the first direction.

13. In an elevator system, a structure having a plurality of landings, an elevator car having a doorway, means mounting the elevator car for movement relative to the structure to serve the landings, motive means for moving the elevator car relative to the structure, an elevator car door, means mounting the door for movement to open and expose said doorway, auxiliary equipment for said elevator car having an operating condition when the elevator car is in service and a non-operating condition, transfer means responsive to a predetermined out-of-service condition of the elevator car while the door is closed for transferring the auxiliary equipment from operating condition to non-operating condition, and means permitting said transferring of the auxiliary equipment by said transfer means to non-operating condition only while the door is closed.

14. In an elevator system, a structure having a plurality of landings, an elevator car having a doorway, means mounting the elevator car for movement relative to the structure to serve the landings, motive means for moving the elevator car relative to the structure, an elevator car door, means mounting the door for movement to open and expose said doorway, auxiliary equipment comprising a lamp for said elevator car having an operating condition when the elevator car is in service and a non-operating condition, transfer means responsive to failure of the elevator car to run for a substantial time for transferring said lamp from operating to non-operating condition while the elevator car door is closed, and means preventing said transferring of the lamp to non-operating condition while the door is open.

15. In an elevator system, an elevator car, a car call push button for said car, a first electric switch, a second electric switch, means responsive to operation of the push button for operating the first switch from a first to a second condition for a substantial time, means responsive to operation of the push button in one direction for operating the second switch from a first condition to a second condition and back to the first condition, and control means for controlling operation of the elevator car, said control means including first electrically-operated means effective in response to operation of the first switch to the second condition for modifying the operation of the elevator car, and second electrically-operated means responsive to operation of the second switch by the push button.

16. In an elevator system, a structure having a plurality of landings including a terminal landing, a plurality of elevator cars, means mounting the elevator cars for movement relative to the structure to serve the landings, separate motive means for moving each of the elevator cars relative to the structure, a separate source of energy for each of the motive means, each of the sources having an operating and a non-operating condition, and control means for controlling the starting and stopping of the elevator cars, said control means comprising registering means for registering a demand for elevator service, dispatching means for selecting one elevator car at a time present at the terminal landing as the next elevator car to be dispatched and for initiating starting of the selected elevator car to answer a predetermined demand registered by the registering means, first selecting means establishing a first mode of operation for intermittent service wherein the source of energy of each of the selected elevator cars is placed in operating condition in response to a predetermined demand for service and wherein each operating source of energy is placed in non-operating condition in response to decrease of the demand below a predetermined value, second selecting means establishing a second mode of operation for substantially continuous service wherein the source of energy are maintained in operating condition for the duration of the second mode of operation despite temporary decrease in demand for service below said predetermined value, and transfer means responsive to a predetermined condition occurring automatically while the elevator system is prepared to carry passengers for transferring the system from control by the first selecting means to control by the second selecting means, said predetermined condition comprising an increase in the demand for elevator service above a predetermined level.

17. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, third call registering means for registering calls for landings at which the elevator car is to discharge load, means for stopping an elevator car at each landing approached by the elevator car for which a call is registered by the call registering means which may be served by such elevator car without change in direction of travel, means selectively operable for establishing first and second modes of operation of the elevator cars, and transfer means responsive to a predetermined relation between calls registered by the first call registering means and calls registered by all of the call registering means for transferring the system from the first mode to the second mode of operation, said pedetermined relation representing a ratio of the calls registered by the first call registering means to calls registered by all of the call registering means.

18. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, and transfer means responsive to a predetermined condition of the system for transferring the system from the first mode to the second mode, said condition of the system including a predetermined rate of bypassing of the elevator cars while set for travel in one direction, the transfer means resetting the system to the first mode in response to a predetermined change in the system condition, and means responsive to a predetermined bypassing operation of the elevator cars while the system is operating in said second mode for extending the continuous period of operation in said second mode despite subsequent occurrence of said predetermined change.

19. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, and transfer means responsive to a predetermined condition of the system for transferring the system from the first mode to the second mode, said condition of the system including a predetermined rate of bypassing of the elevator cars while set for travel in one direction, the transfer means resetting the system to the first mode in response to a predetermined change in the system condition, and means responsive to each bypassing operation of the elevator cars while the system is operating in the second mode for extending the continuous period of operation in the second mode despite subsequent occurrence of said predetermined change.

20. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, transfer means responsive to a predetermined condition of the system for transferring the system from the first mode to the second mode, said condition of the system including a predetermined rate of bypassing of the elevator cars while set for travel in one direction, and means effective after the predetermined rate has been reached for reducing the rate of bypassing required to permit such transferring.

21. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, transfer means responsive to a predetermined condition of the system for transferring the system from the first mode to the second mode, said condition of the system including a predetermined call registration by the first call registering means for a first group of said landings, a predetermined call registration by the first call registering means for a second group of said landings, absence of a predetermined loading of an elevator car starting a trip in the second direction from a terminal landing, and a predetermined rate of bypassing of the elevator cars while set for travel in the first direction, said second mode of operation conditioning the elevator system to expedite service in the first direction, and means effective after said predetermined rate of bypassing is reached for reducing the rate required to permit such transferring operation.

22. In an elevator system, a structure having a plurality of landings, a plurality of elevator cars, means mounting the elevator cars for movement relative to the structure to serve the landings, separate motive means for moving each of the elevator cars relative to the structure, and control means for controlling the starting and stopping of the elevator car, said control means comprising first call registering means for each of a plurality of the landings for registering calls for elevator service in a first direction desired from the landings, second call registering means for each of a plurality of the landings for registering calls for elevator service in a second direction desired from the landings, means for stopping an elevator car at each landing approached by the elevator car for which a call is registered by the call registering means which may be served by such elevator car without change in direction of travel, means operable for bypassing a landing for which a call is registered by the call registering means, means selectively operable for establishing first and second modes of operation of the elevator cars, transfer means responsive to a predetermined condition of the system for transferring the system from the first mode to the second mode, said condition of the system including a predetermined call registration by the first call registering means for a first group of said landings, a predetermined call registration by the first call registering means for a second group of said landings, absence of a predetermined loading of an elevator car starting a trip in the second direction from a terminal landing, and a predetermined rate of bypassing of the elevator cars while set for travel in the first direction, said second mode of operation conditioning the elevator system to expedite service in the first direction, means responsive to a predetermined system condition for resetting the transfer means following said transferring operation to return the system to said first mode, and means responsive to operation of the bypassing means while the system is conditioned for the second mode of operation for extending the continuous period of operation in said second mode despite subsequent occurrence of said predetermined system condition.

23. In an elevator system for a structure having a plurality of landings, an elevator car, means mounting the elevator car for movement relative to the structure to serve the landings, a plurality of car call push buttons for said car, one of said buttons being provided for each of the landings, each of said buttons comprising: a first electric switch, a second electric switch, means responsive to operation of the push button for operating the first switch from a first to a second condition for a substantial time, and means responsive to operation of the push button in one direction for operating the second switch from a first condition to a second condition and back to the first condition, and control means for controlling operation of the elevator car, said control means including means for starting the elevator car and stopping the elevator car for each landing approached by the elevator car for which the first switch of the associated car call push button is operated, means including a stepping switch for modifying the operation of the system in dependence on operation of the stepping switch, and electrical circuit means for advancing the stepping switch for each operation of each of the second switches to the second condition.

No references cited.